(12) United States Patent
Rivard et al.

(10) Patent No.: US 10,057,712 B2
(45) Date of Patent: *Aug. 21, 2018

(54) MOBILE DEVICE WITH APPLICATIONS THAT USE A COMMON PLACE CARD TO DISPLAY DATA RELATING TO A LOCATION

(71) Applicant: Apple Inc., Cupertino, CA (US)

(72) Inventors: Nathaniel R. Rivard, San Francisco, CA (US); Marcel van Os, Santa Cruz, CA (US); Emanuele Vulcano, San Francisco, CA (US); Srichand Pendyala, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,870

(22) Filed: Jul. 10, 2017

(65) Prior Publication Data

US 2018/0020321 A1    Jan. 18, 2018

Related U.S. Application Data

(63) Continuation of application No. 14/292,786, filed on May 30, 2014, now Pat. No. 9,706,346.

(60) Provisional application No. 61/893,130, filed on Oct. 18, 2013, provisional application No. 61/938,474, filed on Feb. 11, 2014.

(51) Int. Cl.
*H04W 4/02* (2018.01)
*G06Q 30/02* (2012.01)

(52) U.S. Cl.
CPC .................................. *H04W 4/02* (2013.01)

(58) Field of Classification Search
CPC ......... H04L 29/08108; H04L 29/08657; H04L 29/08936; H04W 4/02; H04W 64/00
See application file for complete search history.

(56) References Cited

U.S. PATENT DOCUMENTS

| 8,606,720 | B1* | 12/2013 | Baker | G06Q 20/00 705/64 |
| 8,701,051 | B2* | 4/2014 | Dharmaji | G06Q 30/0267 705/14.64 |
| 8,925,805 | B2* | 1/2015 | Grigg | G06Q 20/36 235/380 |
| 2011/0184790 | A1* | 7/2011 | Deol Brar | G06Q 30/02 705/14.4 |

* cited by examiner

*Primary Examiner* — Sharad Rampuria
(74) *Attorney, Agent, or Firm* — Fletcher Yoder PC

(57) ABSTRACT

Some embodiments provide a mobile computing device that includes a number of applications having a common display area to display data relating to a location. In some embodiments, the common display area is a unified display area to display different types of data. The different types of data can include information regarding the location, multimedia associated with the location, user feedbacks regarding the location, a catalog associated with the location, social network data, etc. In some embodiments, the unified common display area is also referred to as a place card because it presents data relating to a place.

22 Claims, 21 Drawing Sheets

MOBILE DEVICE WITH APPLICATIONS THAT USE A COMMON PLACE CARD TO DISPLAY DATA RELATING TO A LOCATION

CROSS-REFERENCE TO RELATED APPLICATIONS

This application claims the benefit of U.S. application Ser. No. 14/292,786, filed on May 30, 2014, which claims benefit of U.S. Provisional Patent Application 61/893,130 filed on Oct. 18, 2013 and U.S. Provisional Patent Application 61/938,474, filed on Feb. 11, 2014. These patent applications are incorporated herein by reference.

BACKGROUND

The mobile device industry has been growing for a number of years. With the growth, there are an increasing number of applications. One of the problems with such increasing number is that different applications are displaying data relating to a same entity, such a location. As an example, if a person wishes to go to a movie theatre to catch a movie, then the person may have to open up multiple different applications to view different pieces of data relating to the same movie theatre. The person may have to open up a movie showtime application to check what movies are playing at the movie theatre. If the person needs driving directions to the movie theatre, then the person may have to open up a maps application. If the person wants to see what other people are saying about the movie theatre, then the person has to open up a business review application. This makes it very inconvenient for the person who has to navigate between different pages or views of not one application but several different applications in order to view data relating to the same place.

SUMMARY

Embodiments described herein provide a mobile computing device that includes a number of different applications having a common display area to display data relating to a location. In some embodiments, the common display area is a unified display area to display different types of data. Examples of the different types of data include information regarding the location (e.g., address, phone number, etc.), multimedia associated with the location (e.g., video, photos), user feedbacks regarding the location (e.g., reviews), a catalog associated with the location (e.g., a menu, movie showtimes, schedule of events), social network data (e.g., social network posts, photos, video clips), etc. In some embodiments, the unified common display area 10 is also referred to as a place card because it presents data relating to a place.

In some embodiments, the different types of applications include a contacts application that uses the common place card as a contact card for that location. The applications may include a maps application that displays the common place card when a person selects the location from a map. The applications may include a phone application that displays the common place card when a person selects a recent phone call made with the mobile device. The applications may include a message application that displays the common place card when a person selects a representation of the location from a message (e.g., a text message). The applications may include a third-party application that displays the common place card when a person selects an affordance to view data relating to the location.

In some embodiments, the applications of the mobile device share a local cache to display place cards relating to different locations. An application may retrieve data from the local cache using a unique identifier (ID). In some embodiments, the unique ID is a point of interest ID. In some embodiments, the unique ID is a telephone number. Different applications may use different types of unique IDs to retrieve data from the local cache. If the data is not stored in the local cache, the application of some embodiments retrieves the data from one or more data servers.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

DETAILED DESCRIPTION OF SPECIFIC EMBODIMENTS

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Embodiments described herein provide a mobile computing device that includes a number of applications having a common display area to display data relating to a location. In some embodiments, the common display area is a unified display area to display different types of data. Examples of the different types of data include information regarding the location (e.g., 10 address, phone number, etc.), multimedia associated with the location (e.g., video, photos), user feedbacks regarding the location (e.g., reviews), a catalog associated with the location (e.g., a menu, movie showtimes, schedule of events), social network data (e.g., social network posts, photos, video clips), etc. In some embodiments, the unified common display area is also referred to as a place card because it presents data relating to a place.

Figure 1:
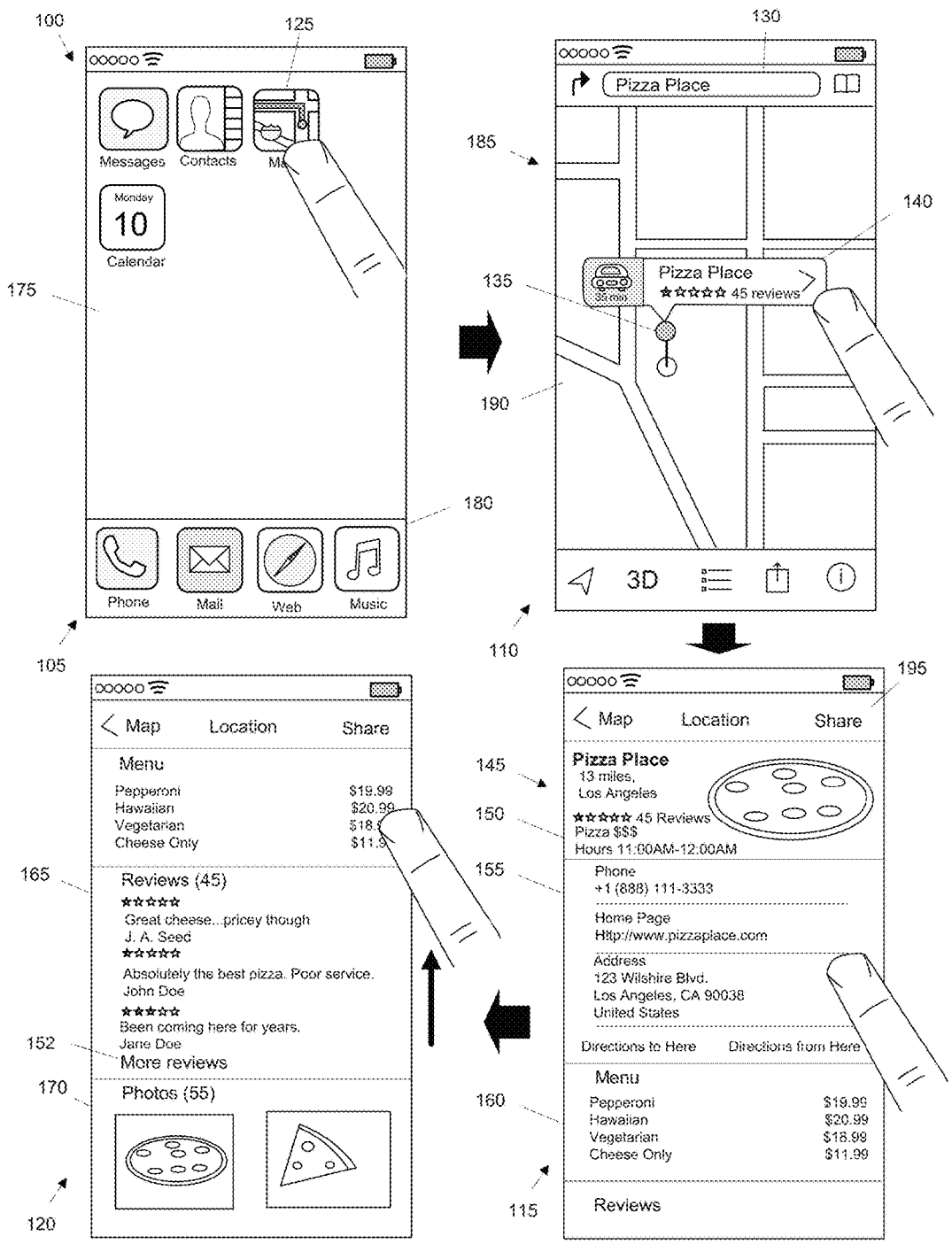
FIG. 1 illustrates an example of a place card that displays various different types of 5 data relating to a location.

For some embodiments of the invention, FIG. 1 illustrates an example of a place card that displays various different types of data relating to a location. In particular, the figure shows a person interacting with a maps application 185 on the person's mobile device 100 to display a place card page 145. The example is illustrated in terms of four stages 105-120 of operation of the mobile device 100. In this example, as well as many other examples below, the mobile device 100 is a smart phone. However, one of ordinary skill in the art will realize that the discussion in this example as well as other examples discussed hereinafter is equally applicable to other kinds of mobile devices (e.g., a tablet, a smart watch, laptop, etc.) or any other electronic devices (e.g., a digital media player appliances, a gaming system, etc.).

As illustrated in these stages 105-120, the mobile device 100 has a touch-sensitive screen. The touch-sensitive screen displays a home page 175 on which application icons can be selected and arranged, and overlaying the page is a dock 180 on which icons of several other applications can be selected and arranged. A user of the mobile device can touch-select an application icon to open or switch to a previously opened application, and can make other gestures to navigate between different display areas (e.g., application pages, home page screens, etc.).

The first stage 105 illustrates the user selecting a maps icon 125 to open the maps application. In particular, the stage 105 shows that the home page 175 includes icons to open a messages application, a contacts application, and the maps application. In opening the maps applications, the user performs a touch-based gesture on the device's touch screen display by tapping the user's finger over the maps icon 125 on the home page 175.

As illustrated in the second stage 110, the touch-based gesture causes the maps application 185 to be opened on the mobile device 100. The second stage 110 also shows that the user has performed a search of a location with the maps application 185. As shown, the user has inputted the name of a location (e.g., a point of interest) into a search field 130 and directed the maps application 185 to show a map with the location. The maps application 185 has performed the search and has generated a display of a map page 190 with the location. The location is a place of business, namely a restaurant. However, the location can be any different location. For instance, the location can be recreational area (e.g., a park, a beach), a building, a structure (e.g., a parking lot), etc. The location can even be a mall that has several businesses.

Referring to the second stage 110, the map page 190 includes a pin 135 that points to the restaurant. Above the pin is a banner 140 that display several pieces of information related to the location. The user might have selected the pin to display the banner. The banner 140 shows an estimated time to reach the restaurant by car, the name of the restaurant, the user rating associated with the restaurant. Here, the user taps the user's finger over the banner on the device's touch screen display. The touch gesture causes the maps application 185 to present a place card page 145, as illustrated in the third stage 115.

The third stage 115 shows the device 100 displaying the place card page 145 on the touch-sensitive screen. The place card page is shown with a top bar 195 that includes two affordances (e.g., selectable items) to return to a previous view and to share the location, respectively. In some embodiment, the place card page is a unified display area to display different types of data relating to the location. For instance, the third stage 115 shows that the place card page 145 includes various different sections 150-170. Each section includes some group of data relating to the restaurant.

In some embodiments, the sections of the place card page 145 are ordered to show a first group of data that a person would most likely be interested in at the top of the place card page 145, followed by the next most likely group, and so forth. In some embodiments, the first section 150 represents a virtual stage 150, which present several key pieces of information about the location. As an example, the virtual stages 150 shows (1) the name of the restaurant, (2) the estimated travel distance to the restaurant from the current location (e.g., of the mobile device), (3) the city where the restaurant is located, (4) the price range associated with the restaurant, (5) the number of reviews associated with the restaurant, and (6) the restaurant's hours of operation.

In some embodiments, the virtual stage 150 shows a set of one or more photos associated with the restaurant. One or more photos may be shown as background images in the virtual stage. Each photo might have been uploaded to a server (e.g., a business review service server) by a person that visited the location. In conjunction with one or more photos, or instead of them, the virtual stage 150 of some embodiments displays one or more video clip. In some embodiments, the virtual stage 150 shows a map. For instance, if a location is not associated with any photos, the virtual stage of some embodiments shows a map. The map can be a flyover 3D image of the location, a street view of the location, a satellite image, or some other type of map that shows the location.

The third stage 115 also shows a second section 155 that includes general information regarding the business. The information section 155 include (1) a phone number of the restaurant, (2) a uniform resource locator (URL) or a web address of the restaurant's website, and (3) a physical address of the restaurant. The information section 155 shows that the place card of some embodiments is a staging area to display additional data. For instance, the information section includes one or more affordances (e.g., selectable items, links) to display driving directions (e.g., directions to the location, directions from the location).

The third stage 115 also shows a following third section 160 that includes a catalog associated with the location. The catalog represents a list of items associated with the location. The items can be what the location is offering for sale. For instance, a catalog of a vending machine includes items that are dispensed by the vending machine. The catalog 160 can change depending on what the location is offering. A place can also be associated with multiple catalogs. For instance, a place may offer multiple different types of items, such as food and other tangible goods. As another example, a mall can include number of catalogs featuring item from some of its stores.

The catalog can include services. Further, the catalog can include events. For instance, a movie theatre's catalog can include movie showtimes. A stadium's catalog can include sporting events, concerts, shows, etc. In some embodiments, the place card page provides affordances (e.g., buttons) to purchase items from the page or to navigate to another page to purchase the items. In the example of the third stage 115, the catalog is the restaurant's menu. The menu 160 lists various menu items along with a price for each item.

The fourth stage 120 shows that the place card page 145 includes additional sections 165 and 170. To display these additional sections, the user has performed a touch gesture on the touch screen display to scroll the place card page. Specifically, the user has placed a finger on the touch screen display and dragged the finger up the screen. The gesture caused the place card page to scroll up in accord with the movement of the finger and reveal these sections. The sections include a fourth section 165 with a number of reviews and a fifth section 170 with a number of photos.

The review section 165 shows user reviews. In the example of the fourth stage 120, the review section 165 includes a review heading. Next to the review heading is a number that identifies the number of reviews associated with the restaurant. Underneath the heading are several reviews. Each review is listed with a rating (e.g. a star rating), a review, and the name of person that reviewed the location. One of ordinary skill in the art would understand that the presentation of the reviews in the fourth stage 120 is an example presentation and that the reviews can be presented differently. For instance, each review might be listed with the date of the review, the number of people that found the review helpful, a follow-up review, etc. The sorting of the reviews may be customizable. The sorting of the reviews may be based on feedbacks from other people regarding the reviews, the date of the review, etc.

In some embodiments, the place card only shows a few of the reviews and provides an option to show additional reviews. For instance, in the fourth stage 120, the review section 165 only lists three reviews. The user can tap on a selectable item or a link to display additional reviews. For instance, if the user wishes to view additional reviews, the user can tap his or her finger on the touch screen display over the text 152 that states, "More reviews". In some embodiments, the selection of such item causes the place card to expand (e.g., vertically) and display additional reviews. In some embodiments, the place card provides an affordance to download all data objects, such as reviews.

In some embodiments, the place card page 145 shows social network data. For instance, the place card may include a separate section that lists social network posts. The data can come from different social network service providers. For instance, the place card can include one set of posts from one social network service and another set of posts from another social network service.

As shown in the fourth stage 120, the last section 170 shows several photos associated with the location. In some embodiments, the photos represent the ones uploaded to a set of servers by different people that visited the location. The set of servers may be maintained by a business review service provider, a social network service provider, a photo sharing service provider, or a microblog service provider. In some embodiments, the place card page shows thumbnail representations of photos. In some embodiments, the thumbnail representations can be selected to open larger (e.g., full-screen) representations of the same photos.

Similar to the review section 165, the photo section 170 includes a heading. Next to the photo heading is a number that identifies the number of photos associated with the restaurant. Also, similar to the review section, the photo section 170 might not show all photos but only a few photos with an option to display additional photos. The sorting of the photos may be customizable. The sorting of the photos may be based on feedbacks from other people regarding the photos, the date of the photos, etc. In the example of the fourth stage 120, the first photo is the same as the one shown in the first section 150 (e.g., in the virtual stage).

In conjunction with photos or instead of them, the place card page 145 of some embodiments displays video clips. The video clips can be shown in the same section as the photos. Alternatively, the place card page 145 can include a separate section to display video clips. Similar to the photos, the video clips can be from one or more different data service providers (e.g., a business review service provider, a social network service provider, a photo sharing service provider, a microblog service provider, etc.).

In the example described above, the place card 145 shows at least some information in each section. The user does not have to navigate between different tabs or pages to view these different items. They are all available on one place card. This is important from a data transfer standpoint because not all data need to be downloaded from one or more servers to show the place card. If a section does not list all items, there is an option to show more items. The selection of such option may expand the place card to display more items. Alternatively, the selection of such item may cause the application to display another page.

As mentioned above, the place card of some embodiments is a common display area. This means that the same or similar place card is shown in two or more different applications running on a mobile device. In the example described above, the application with the place card is a maps application.

Figure 2:
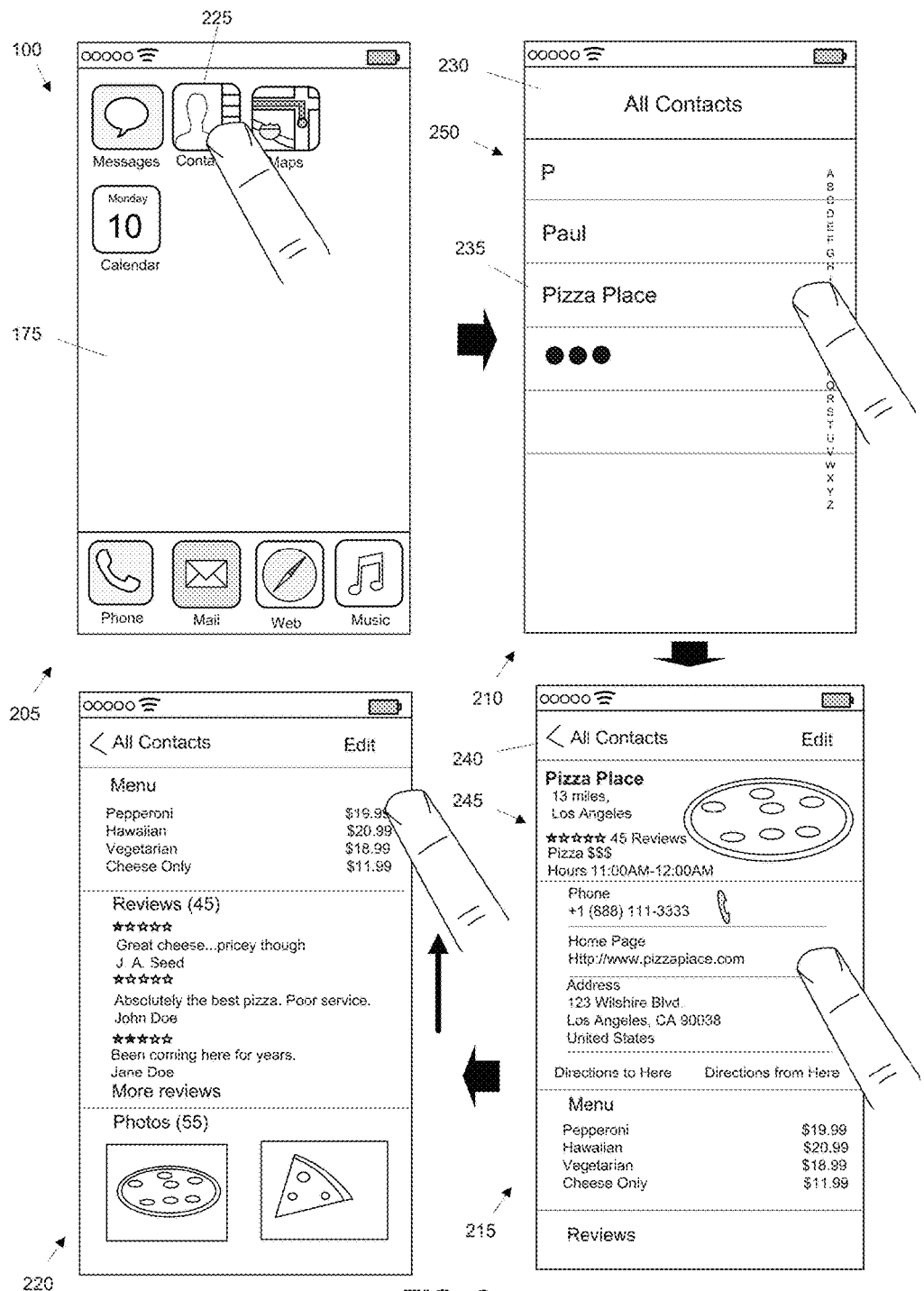
FIG. 2 provides an illustrative example of a contacts application that uses a place card to display data relating to a location.

FIG. 2 provides an illustrative example of a contacts application that uses a place card to display data relating to a location. Specially, this figure shows that the contacts application of some embodiments has replaced a contact card user interface (UI) with a place card (UI). Four 5 operations stages 205-220 of the mobile device 100 are shown in the figure. The mobile device 100 is the same as the one described above by reference to FIG. 1.

The first stage 205 illustrates the user selecting a contacts icon 225 from the home page 175 to open the contacts application. As shown in the second stage 210, the selection of the contacts icon causes the mobile device 100 to open the contacts application 250 and display a contacts list page 230 or an address book page. The contacts list page 230 lists several contacts, including a contact 235 for a business entity. The business entity is the same restaurant shown in FIG. 1. To display data associated with the contact, in the second stage 210 of FIG. 2, the user selects the contact 235 from the contacts list page 230.

The third stage 215 illustrates that the selection of the contact 235 resulted in the display of a contacts page 245. Here, the contacts application uses a place card page 245 as its contact page. In other words, the contacts application replaces a user editable contact form page with a place card page. As will be described below by reference to FIG. 10, unlike a typical static contact card, the place card is automatically updated without any user input when there is an update in the data associated with the location.

The third and fourth stages 215 and 220 show that the place card page 245 is similar to the one described above by reference to FIG. 1. The place card page 245 includes a virtual stage, an information section, a menu section, a review section, and a photo section. Different from the FIG. 1, the place card page includes an affordance to edit or modify the place card page. The affordance is shown on a top bar 240. This top bar 240 also includes an affordance to return to the contacts list page 230.

Figure 3:
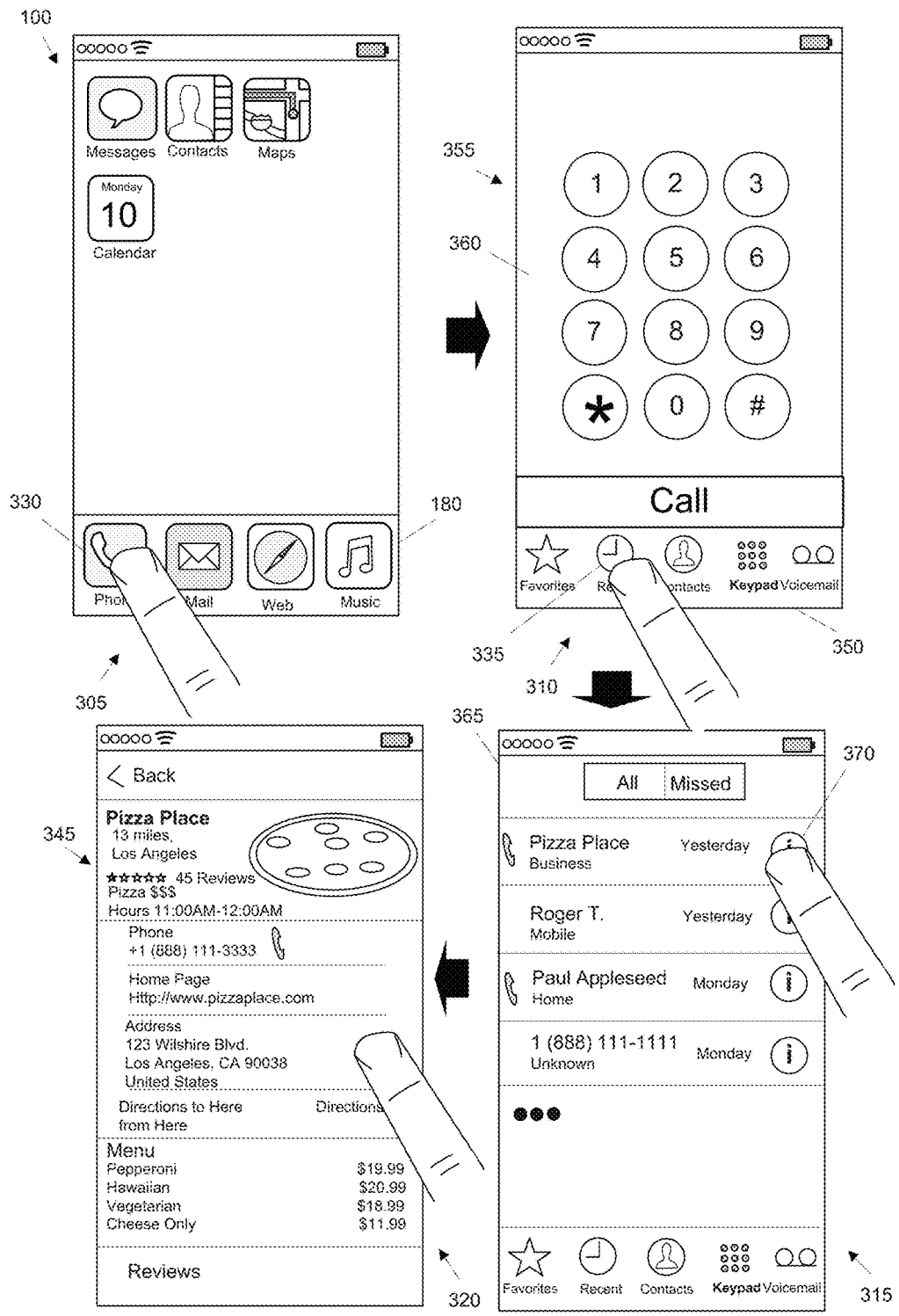
FIG. 3 provides an illustrative example of a phone application that uses a place card to display data relating to a location.

In the preceding example, the contacts application shows data relating to a location in a place card. FIG. 3 provides an illustrative example of a phone application that uses a place card to display data relating to a location. Specially, this figure shows that a person can access the place card by selecting an item from a page that lists recent calls. Four operations stages 305-320 of the mobile device 100 are shown in the figure. The mobile device is the same as the one described above by reference to FIG. 1.

The first stage 305 illustrates the user selecting a phone icon 330 from the dock 180 to open the phone application. As shown in the second stage 310, the selection of the phone icon 330 causes the mobile device 100 to open the phone application 355. The phone application is showing a keypad page 360 to input a phone number to make a phone call. The keypad page 360 is shown with a bottom bar 350 that includes an affordance (e.g., a selectable item 335) to view recent calls made with the mobile device.

In the second stage 310, the user directs the mobile device to display the list of recent calls by tapping a finger over the device's touch-screen display over the selectable item 335. As shown in the third stage 315, the touch-based gesture causes the mobile device 100 to display a recent call page 365 with a list of recent calls. In this example, each phone call is shown with a name or a phone number, the type of phone number (e.g., a business number, a home number, mobile number, unknown, etc.), and the date of the phone call (e.g., yesterday, Monday, Tuesday, etc.). A phone call may also be listed with a symbol or icon that indicates whether the phone call is a missed call or not.

The recent call page 365 of some embodiments lists each recent call with an affordance to display additional information regarding an entity associated with the phone call. For instance, in the example of the third stage 315, the recent call page 365 includes a selectable item 370 (e.g., an information button) next to each phone call. In some embodiments, the selection of the selectable item causes the phone application to show a place card or a contact card that displays data relating to an entity (e.g., a person, a business, etc.).

In the third stage 315, the user selects the selectable item 370 by tapping a finger on the device's touch-screen display over the selectable item. The fourth stage 320 illustrates that the selection of the selectable item 370 resulted in the display of a place card page 345. The place card page 345 is similar to the ones described above by reference to FIGS. 1 and 2. The place card page includes a virtual stage, an information section, a menu section, a review section, etc.

In the example described above, the phone application is used to display a place card relating to a location. In some embodiments, the phone application displays such a place card regardless of whether the location is stored as a contact in a contacts list (e.g., a contacts database). To display the place card, the phone application of some embodiments accesses a local cache that is shared with one or more other applications.

In some embodiments, the phone application searches the local cache using a phone number. For instance, the phone application may search the local cache to determine if a group of data is associated with the same phone number. If so, the phone application retrieves the group of data to present a place card with that data. Several examples of retrieving data from a shared local cache are described below by reference to FIG. 6.

In some embodiments, the application with the common unified display area is a first party application. The first-party application is an application provided by a developer of the mobile device operating system (OS). Some first party applications come pre-installed with the mobile OS. In the examples described above, the maps application, the contacts application, and the phone application are all first-party applications.

Figure 4:
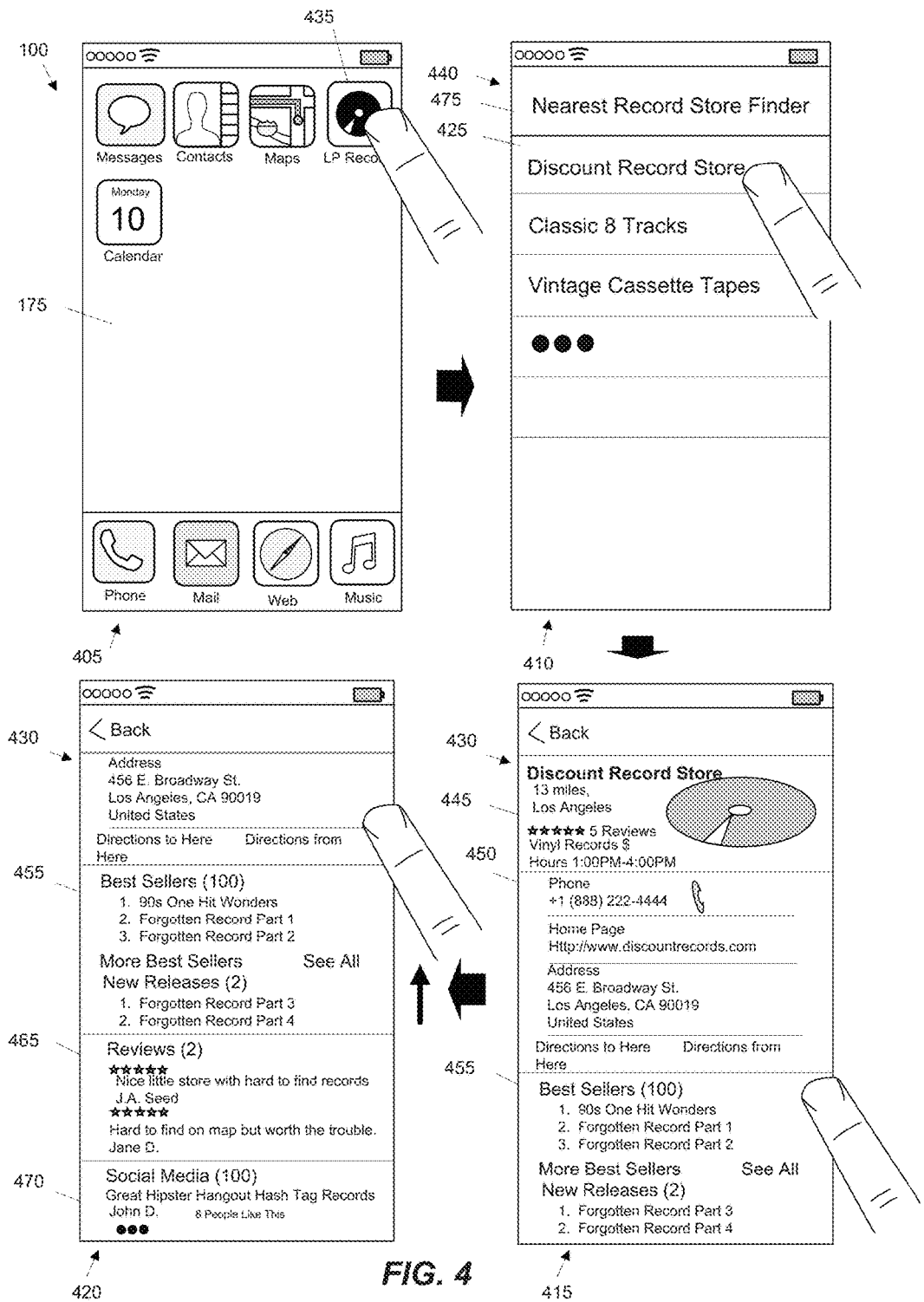
FIG. 4 illustrates an example of a third-party application that uses a place card to display data relating to a location.

Some embodiments provide application development tools (e.g., a set of application programming interfaces (APIs) and/or a set of frameworks) that application developers can use to implement the place card feature for their respective applications. Accordingly, in some embodiments, the application with the common unified display area is a third party application. FIG. 4 illustrates an example of a third-party application that uses a place card to display data relating to a location. Four operations stages 405-420 of the mobile devices 100 are shown in the figure. The mobile device is the same as the one described above by reference to FIG. 1.

As shown in the first stage 405, the home page 175 includes an icon 435 to open a third party application. In this example, the third-party application is application to find music records. To open the application, the user selects the icon 435 from the home page 175.

The second stage 410 shows the mobile device 100 after opening the third-party application 440. The application 440 shows a record store finder page 475 that displays a list of the nearest record stores. The user has reviewed the list and has selected the first item 425 from the list. The third stage 415 shows that the selection resulted in the application displaying a place card page 430. As the location is a record store, the place card page 430 shows various different types of data relating to the record store. For instance, the place card page 430 includes a virtual stage 445 to display several key pieces of information relating to the record store and an information section 450 to display general information. The place card page 430 also includes its own special section 455 with dynamic data associated with the record store. In this example, the section 455 shows a few of its best sellers as a well as a list of current or new releases. As mentioned above, the different types of data shown in a place card depends on the location. For instance, a place card for a bus station or a train station may include such dynamic data as transit stop times, a place card for an airport may include a flight schedule, a place card for a wellknown place (e.g., a landmark, a lake, a public park, etc.) may include a description (e.g., a short description or summary) from Wikipedia, etc.

In the third stage 415, the user places a finger on the device's touch screen display. In the fourth stage 420, the user performs a touch gesture on the touch screen to scroll the place card page 430. The gesture causes the touch screen display to show additional sections 465 and 470 in the place card page. Specifically, it shows a review section that includes a number of reviews and a social media section that includes one or more posts from one or more social networks.

Many more examples of presenting place cards are described below. Specifically, Section I describes examples operations performed by each of several applications to present data relating to a location in a place card. This is followed by Section II, which describes how a place card view can be shared across multiple different devices. Section III then describes an example of how a place card of a location is dynamically updated with a change in the data associated with the location. Section IV then describes operations of a phone to display a place card. Section IV also describes how the phone application shows the name of a location even though the location's phone number is not stored in a contacts list. Section V then describes a system for retrieving data from a set of servers. Finally, Section VI describes electronic systems for implementing some embodiments of the invention.

I. Example Operations

Figure 5:
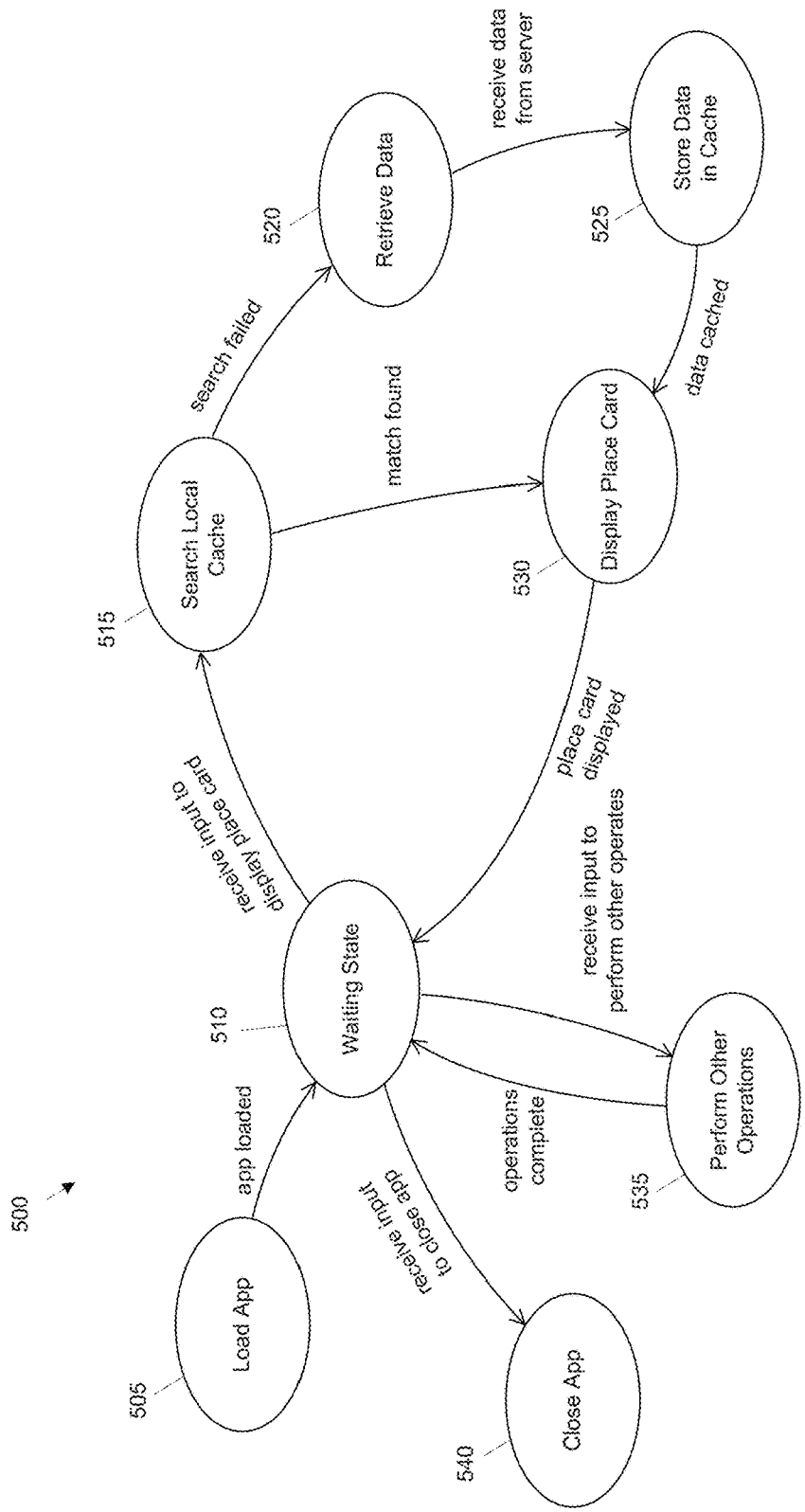
FIG. 5 presents a state diagram that illustrates several example operations performed by an application to display a place card.

Having described several example applications, examples operations performed by one or more of these applications to display a place card will now be described. FIG. 5 presents a state 500 diagram that illustrates several example operations performed by an application to display a place card. This figure shows eight states 505-540 that collectively perform these operations. Each of the states represents a set of one or more processes for performing a subset of the operations.

The eight states are a load application state 505, a waiting state 510, a search local cache state 515, a retrieve data state 520, a store data state 525, a display place card state 530, a perform other operations state 535, and a close application state 540. The load application state 505 represents a set of processes running on a device to load the application. In some embodiments, the application enters this state when a user selects an application icon from a homepage or a dock.

As show in FIG. 5, once the application is loaded, the application of some embodiments transitions to a waiting state 510. At this state, the application is listening for different events. Different applications can be listening for different events. For instance, a maps application may be awaiting user input to navigate to a page with a place card, switch to a 3D flyover map, switch to a navigation mode, etc. A calendar application may be awaiting user input to create a new scheduled event, edit an existing event, etc.

When an input is received to display a place card relating to a location, the application transitions to the search local cache state 515. At this state, the application performs a set of processes to search the local cache and retrieve data relating to the location. In some embodiments, the local cache is a shared local cache. This means that several applications are updating and sharing same data in the cache.

In some embodiments, the local cache is searched using a unique identifier (ID) or key. In some embodiments, the unique ID is a point of interest ID. The application of some embodiments uses a phone number as a unique ID. In some embodiments, different applications use different unique identifiers to access the same data stored in the cache. The amount of time a group of data persists in the cache can be based on one or more different criteria. It could be based on a timestamp associated with the group. For instance, the group of data may be retained in the cache for a number of hours, one or more days, months, etc. In some embodiments, data may be removed from the cache if the cache is full or close to being full.

As shown in FIG. 5, if data relating to the location is stored in the local cache, the application transitions to the display place card state 530. At this state, the application performs a set of processes to display a place card. In particular, the application retrieves data from the cache and generates a view of the data.

If data relating to the locating is not stored in the cache, the application transitions to the retrieve data state 520. At this state, the application the application performs a set of processes to retrieve data relating to the location from a set of one or more servers. In some embodiments, the application uses one or more application programming interfaces (APIs) and/or frameworks to retrieve data from the set of servers. Upon receiving the data from the set of servers, the process transitions to the store data state 525. Here, the application performs a set of processes to store data in the local cache. Once the data is stored, the application transitions to the display place card state 530, which is described above.

Different application may perform different operations. For instance, a maps application may perform a number different tasks that a music player application may not be able to perform, and vice versa. Accordingly, the state diagram includes the perform other operations state 535. At this state 535, the application performs a set of processes to perform such different 5 tasks. Finally, when an input to close the application is received, the application transitions to the close application state 540. Here, the application performs a set of processes to close the application. For instance, depending on application, the application might perform one or more processes to save the state of the application.

One of ordinary skill in the art will realize that the state diagram 500 simplifies the operations of the application for purposes of the highlighting the display of a place card. This is because different applications can perform various different operations. Thus, the state diagram focuses on retrieving data from a local cache and from a set of servers if the data is not stored in the cache. The state diagram also focuses on how the application uses the retrieved data to present the place card. One of ordinary skill in the art will also realize that the different applications have different states or different state transitions as they operate differently.

II. Sharing Locations

The application of some embodiments provides tools to a share a location through a message. In some embodiments, the message includes a selectable item (e.g., a link or a representation of the location) that when selected causes a place card to appear. Several examples of such sharing operations will now be described by reference to FIGS. 6-9.

Figure 6:
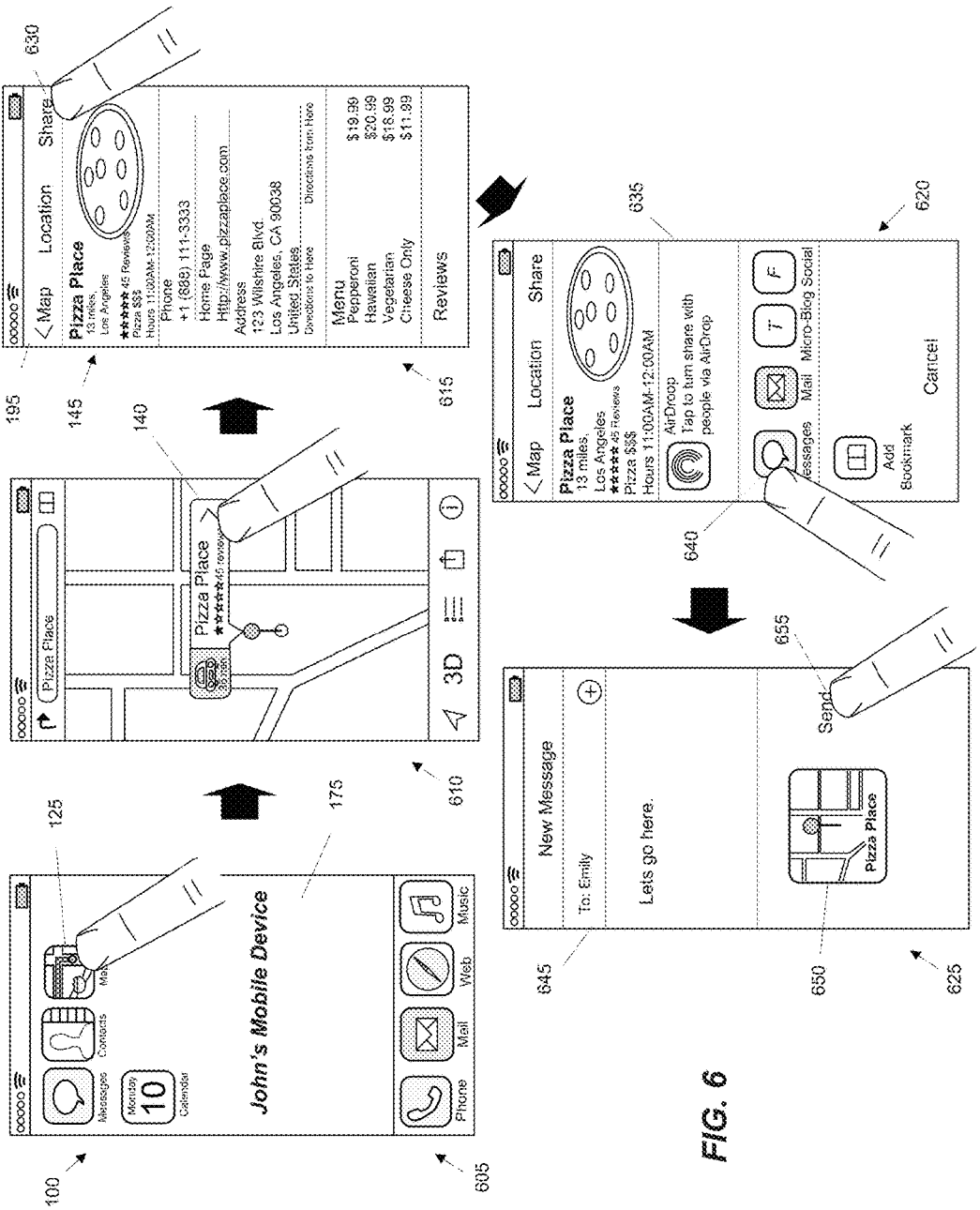
FIG. 6 illustrates an example of a person sharing a location through a text message.

FIG. 6 illustrates an example of a person sharing a location through a text message. In this example, the sender of the text message is a person named John, and the recipient of the text message is a person named Emily. The example shows the same mobile device 100 as described above by reference to FIG. 1. Five operational stages 605-625 of the mobile device 100 are shown in the figure.

The first three stages 605-615 are identical to the ones shown in FIG. 1. Specifically, in the first stage of FIG. 6, the user selects the maps icon 125 from the home page 175. The second stage 610 shows the user selecting the banner 140 that shows information relating to a location. The selection cause the maps application to display the place card 145, as illustrated in the third stage 615.

In the third stage 615, the user selects the affordance 630 (e.g., a share button) from the top bar 195 to share the location. The fourth stage 620 shows that the selection resulted in the display of a share tool. The share tool 635 includes several affordances (e.g., buttons) to share the location through different channels. For instance, the share tool includes affordances to share the location via text message, email, a social network post, and a micro blog. The share tool also includes an affordance to share the location with any nearby device. The user can also use the tool to bookmark the location. At the bottom of the tool, there is also a cancel button that can be selected to close the tool without sharing the location.

In the fourth stage 620, the user selects the affordance 640 to share the location via a text message. The fourth stage 620 shows that the mobile device has generated a text message 645. The text message 645 includes a thumbnail representation 650 of a map that shows the location. Here, the user has already specified a phone number or the name of the recipient of the text message, and typed in text for the body of text message. To send the text message, the user selects a send button 655.

Figure 7:
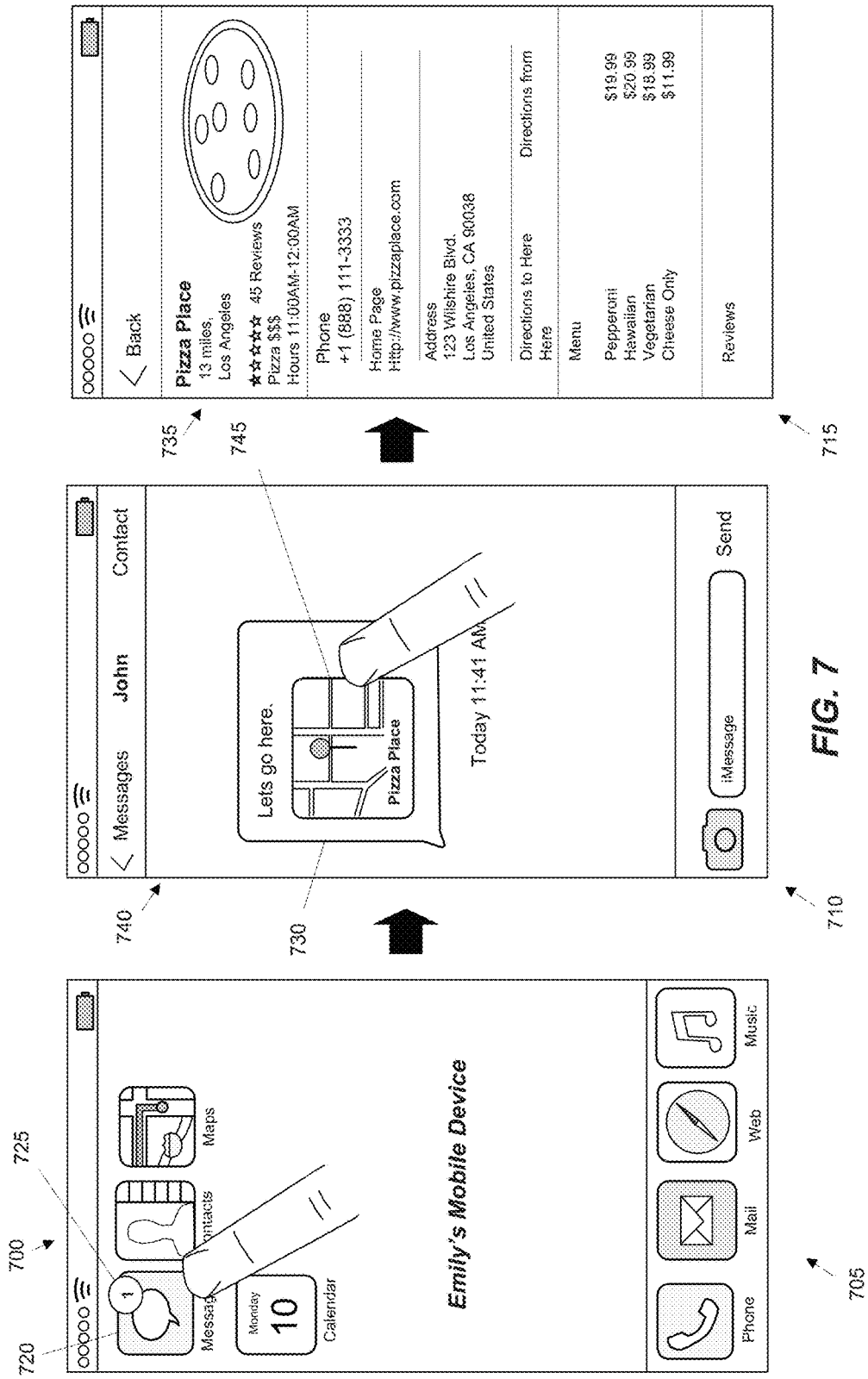
FIG. 7 illustrates an example of a person selecting a a location representation in a text message to open a place card relating to the location.

FIG. 7 illustrates an example of a person selecting a location representation in a text message to open a place card relating to the location. Three operational stages 705-715 of recipient's mobile device 700 are shown in FIG. 7. The first stage 705 shows that the text message from the sender has been received at the mobile device 700. Specifically, the message application icon 720 is shown with a badge 725. The badge 725 provides a visual indication that there is one new text message. To display the new text message, the user of the mobile device 700 selects the application icon.

The second stage 710 shows the user selecting a selectable item in the text message to display a place card. As shown, the message application 740 has been opened. The message application 740 is displaying the text message. In the example of the second stage 710, the text message is shown in a chat bubble 730. The text message includes a thumbnail representation 745 of the map showing the shared location. The text message also includes a message inputted by the sender.

In the second stage 710, the user selects the thumbnail representation 745 by tapping a finger on the mobile device's touch screen display over the thumbnail representation. The third stage 715 shows that the selection of the representation caused the application to display a place card 735. The place card is the same as the one described above by reference to FIG. 1. It shows various different types of data relating to the shared location.

In the example described above, the user selects a thumbnail representation in a text message to display the place card 735. In some embodiments, the application 740 provides other means to open a place card from a text message. For instance, the application might display the text message with a different selectable item or a link. Also, in the example descried above, the location is shared through text message (e.g., iMessage). One of ordinary skill in the art would understand that the example is equally applicable to other messaging applications, such as a chatting application, an email application, an instant messaging application, a social network application with messaging features, etc.

Figure 8:
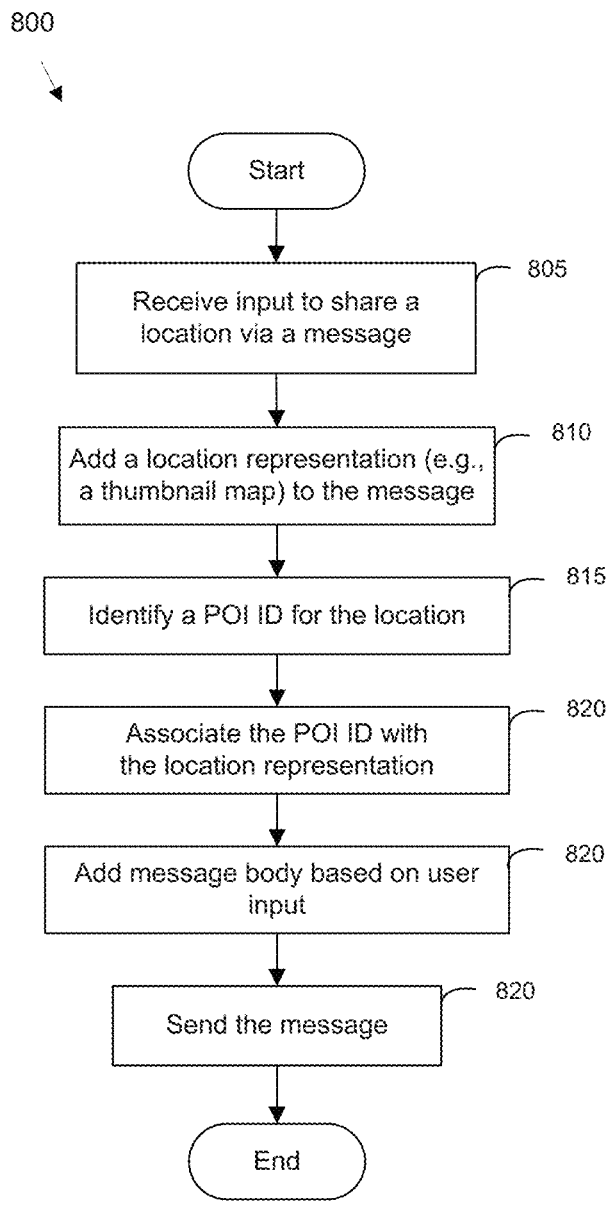
FIG. 8 conceptually illustrates an example process that some embodiments implement to share a location in a message.

Having described example of sharing a location, several processes will now be described by reference to FIGS. 8 and 9. FIG. 8 conceptually illustrates an example process 800 that some embodiments implement to share a location in a message. This is followed by FIG. 9, which conceptually illustrates an example process that some embodiments implement to display a place card of a shared location.

In some embodiments, the process 800 of FIG. 8 is performed by an application on the sender's mobile device. The application can be any application that can be used to share a location. The process 800 begins when it receives (at 805) input to share a location via a message. The process 800 then adds (at 810) a location representation to the message. In the example of FIG. 7, the location representation is a thumbnail image with a map showing the location. In conjunction with the thumbnail image or instead of it, the location representation may show a different representation or text link.

As shown in FIG. 8, the process 800 identifies (at 815) a unique identifier (ID) that is associated with the location. In some embodiments, the unique identifier is a point of interest (POI) ID. The process 800 then associates the unique ID with the location representation. At 820, the process adds any message input from the sender. The process 800 then sends (at 820) the message. The process 800 then ends.

Some embodiments perform variations on the process 800. The specific operations of the process 800 may not be performed in the exact order shown and described. The specific operations may not be performed in one continuous series of operations, and different specific operations may be performed in different embodiments. Further, the process 800 could be implemented using several sub-processes, or as part of a larger macro process.

Figure 9:
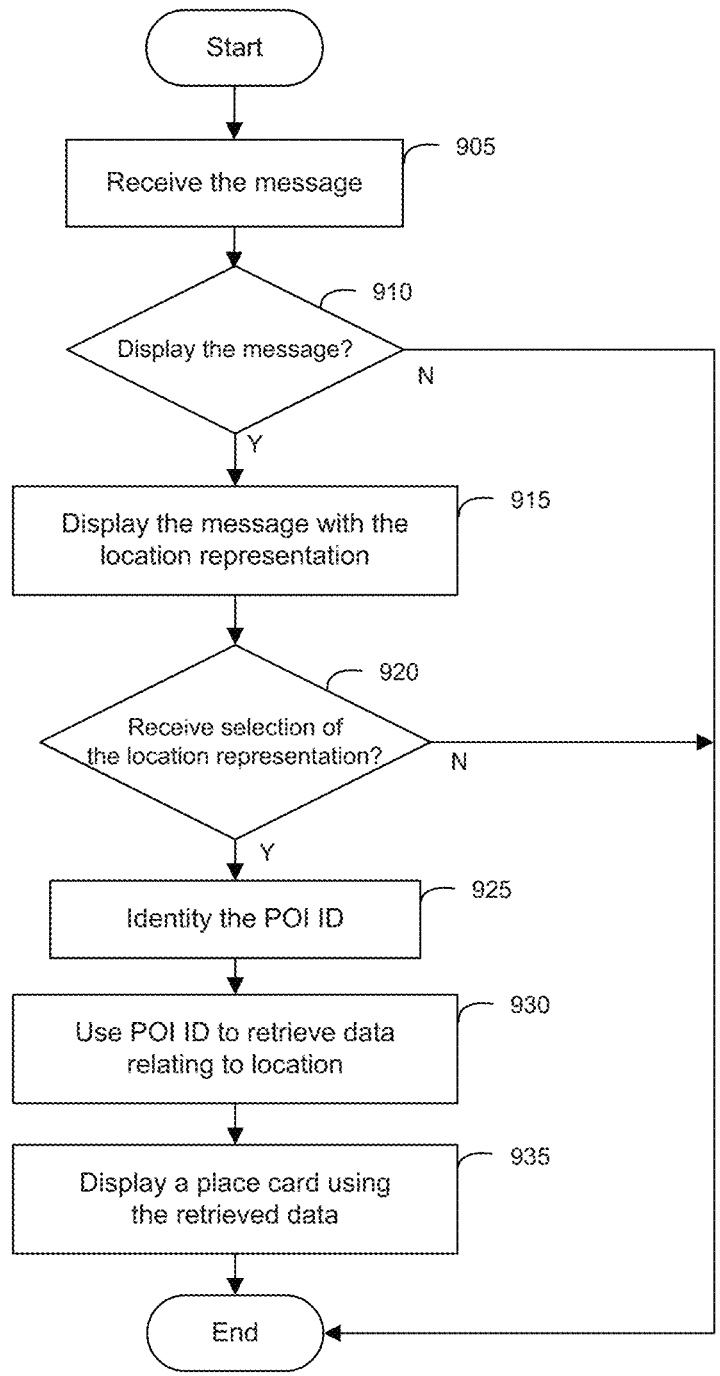
FIG. 9 conceptually illustrates an example process that some embodiments implement to display a place card of a shared location.

FIG. 9 conceptually illustrates an example process 900 that some embodiments implement to display a place card of a shared location. In some embodiments, the process is performed by an application. The application can be any application that is capable of receiving messages, such as a text message application (e.g., for SMS message, iMessage), an email application, an instant application, a social network application with messaging capabilities, etc.

The process 900 begins when it receives (at 905) a message. The process 900 then determines (at 910) whether to display the message. For instance, the process may be listening 10 for user input to display the message. If the determination is made to display the message, the process displays (at 915) the message with the location representation. Otherwise, the process 900 ends.

After displaying the message, the process 900 then determines (at 820) if it received a selection of a location representation in the message. If the location representation has not been selected, the process ends. However, if the location representation has been selected, the process 800 identifies (at 925) the unique ID that is associated with the shared location. As mentioned above, the unique ID can be a POI ID that is associated with the location.

After identifying the unique identifier, the process 900 then uses (at 930) the unique identifier to retrieve data relating to the location. In some embodiments, the process 900 first examines a local cache to retrieve the data. If the data is not stored in the cache, the process 900 of some embodiments retrieves data from a set of one or more servers. The process 900 might retrieve (at 930) the data from the set of servers if the data stored in the local cache is outdated. The process 900 then displays (at 935) a place card using the retrieved data. The process 900 then ends.

Some embodiments perform variations on the process 900. The specific operations of the process 900 may not be performed in the exact order shown and described. The specific operations may not be performed in one continuous series of operations, and different specific operations may be performed in different embodiments. Further, the process 900 could be implemented using several sub-processes, or as part of a larger macro process.

III. Example Place Card Features

Several example features of the place card of some embodiments will now be described by reference to FIGS. 10-12.

A. Dynamic Updates to Place Cards

Similar to a traditional contact card, the place card of some embodiments display information relating to a location. The place card can include a name, one or more phone numbers, a uniform resource locator, an email address, a photo, etc. Different from a contact card, the place card of some embodiments is a unified place card in that it can display other types of data, such as a catalog (e.g., a menu, etc.), multimedia media (e.g., photos, video clips) from a one or more servers, and user reviews. Also, different from a contact card, the place card may be updated each time there is an update to the data relating to the location.

Figure 10:
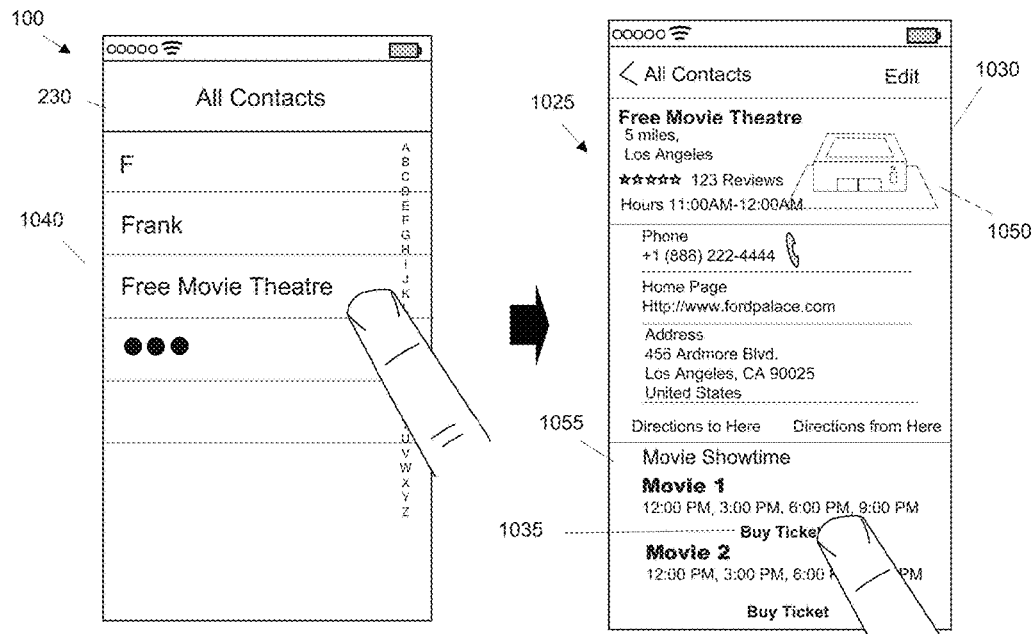
FIG. 10A shows a person opening up a place card of a location using a contacts application to review the location's catalog.
FIG. 10B shows the same place card being reopened to show an updated catalog.

FIG. 10 provides an illustrative example of how a place card is updated in accord with an update to data relating to a location. Specifically, FIG. 10A shows a person opening up a place card for the location using a contacts application to review the location's catalog. This is followed by FIG. 10B, which shows the same place card being opened to show an updated catalog.

Two operational stages 1005 and 1010 of the mobile device 100 are shown in FIG. 10A. The mobile device 100 is the same as the one described above by reference to FIG. 1. In the first stage 1005, the contacts application has been opened to display a list of contacts 230. As shown, the user selects a contact 1040, which represents a location, from the list of contacts.

The second stage 1010 shows that the contacts page 1025 for the location is implemented using a place card. The place card 1025 is similar to the one described above by reference to FIG. 1. However, the place card 1025 displays a map 1050 in the virtual stage 1030. The map is a 3D flyover image of the movie theatre. In addition, instead of a restaurant menu, the place card 1025 shows a listing of events 1055. Since the location is a movie theatre, the events are movie showtimes. The movie listing 1055 includes two movies labeled with numbers one and two, respectively. Each movie is listed with an option 1035 to purchase tickets.

FIG. 10B shows the same place card being opened up once again. In the first stage 1015, the contacts application has been opened to display the list of contacts 230. As shown, the user selects the same contact 1040 from the list. The second stage 1020 shows that the place card 1025 for the location has been dynamically updated. In particular, the place card 1025 has an updated listing of movie showtimes. For instance, the second stage shows that two movies, which are labeled with numbers three and four movies, have replaced the movies labeled with numbers one and two.

In the example described above, the schedule of events is automatically updated without any user input. Alternatively, the place card of some embodiments may show updates to other sections. As an example, the place card may show updates to the virtual stage, the information section, the review section, the multimedia section, etc.

In some embodiments, the contacts application uses the same or similar processes as the ones described above by reference to FIG. 8. For instance, the contacts application may use a shared local cache to display place cards. If the data is not available in the shared local cache, the contact application may retrieve data from one or more servers. In some embodiments, the contacts application first loads (e.g., reads) contact data from a contact storage (e.g., database) and then loads location data from the shared local cache to display additional data. The contact application may load location data when a person selects the contact from the list.

B. In-Line Map

The place card of some embodiments presents a map. The map may be presented in-line in a particular section of the place card page. In some embodiments, the map section is shown in one or more different applications other than the maps application. For instance, a place card page for the contacts application or the phone application may include an in-line map; however, a place card page of the maps application may not include the in-line map. In addition, the map can be any different type of maps, including a 2D map, 3D map, a 3D flyover map, etc.

Figure 11:
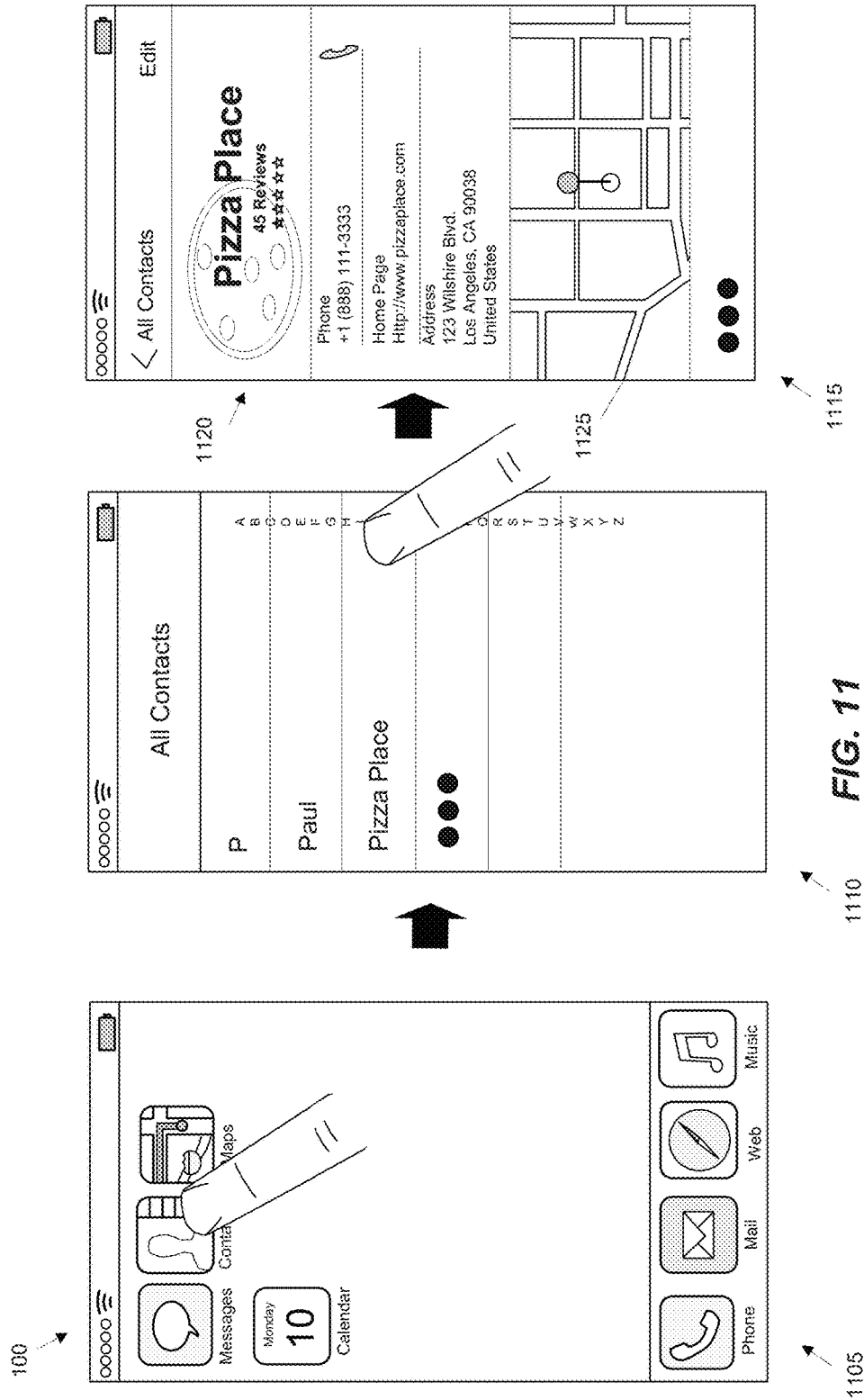
FIG. 11 illustrates an example of a place card that shows a map.

FIG. 11 illustrates an example of a place card that shows a map. Three operational stages 1105-1115 of the mobile device 100 are shown in the figure. The first two stages 1105 and 1110 are identical to one shown in FIG. 2. However, in the third stage 1115, the place card page 1120 is shown with a map 1125. The map 1125 fills a section of the place card page 1120. In some embodiments, the selection of the map 1125 causes a maps application to be opened. For instance, the selection of the map 1125 may result in the maps application opening to a full screen map showing the location.

C. Customizing Place Cards

In some embodiments, the place card can be customized to display different types of data. As an example, a local client may be allowed to add one or more different custom views. In some embodiments, the views may be added to any chosen location (e.g., at the top of the place card below the virtual stage, middle of the place card, bottom of the place card, etc.).

Figure 12:
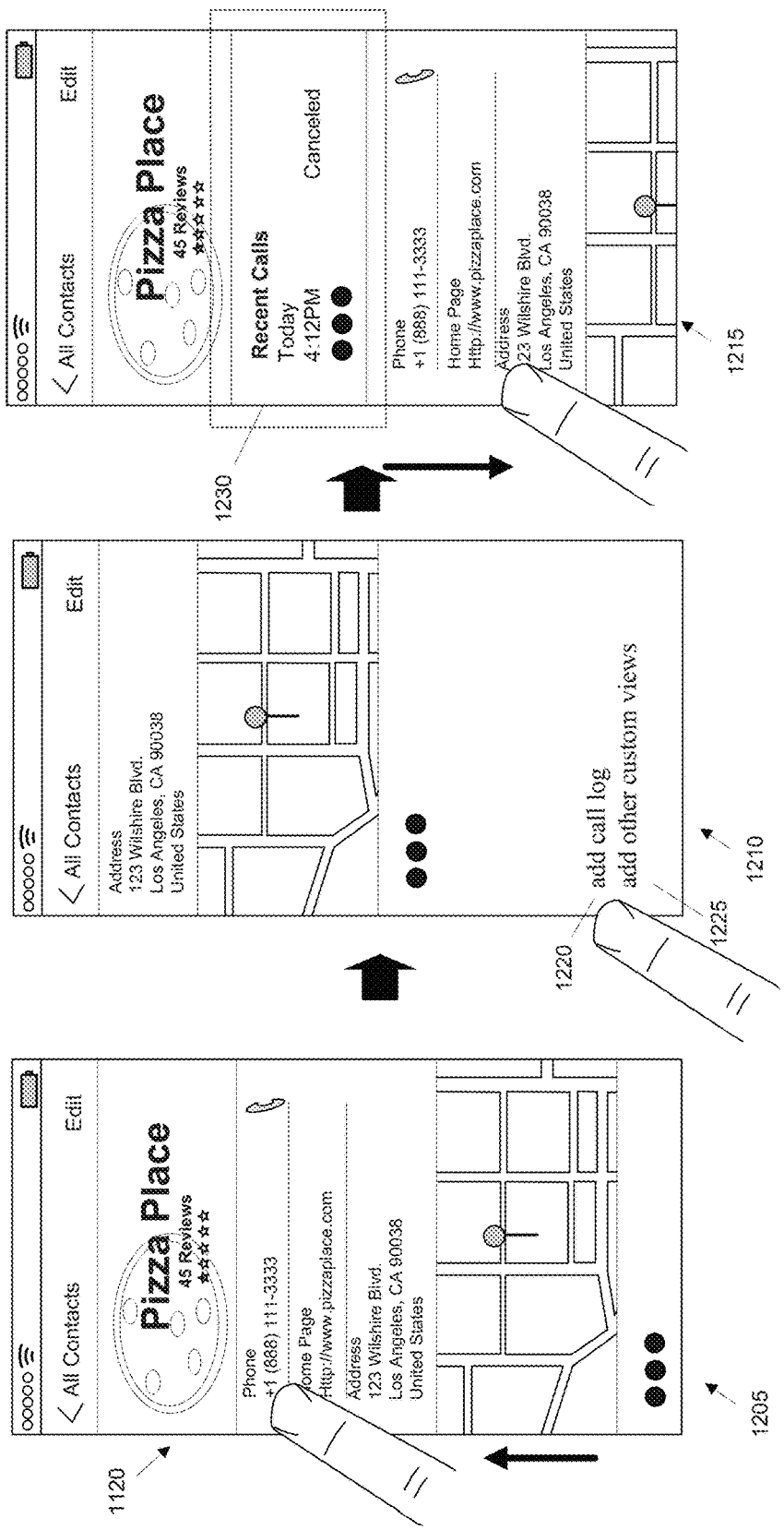
FIG. 12 provides an illustrative example of customizing a place card page.

FIG. 12 provides an illustrative example of customizing a place card page. Three operational stages 1205-1215 of the mobile device 100 are shown in the figure. These stages are continuations of the ones shown in the previous figure. The first stage 1205 shows the mobile displaying the place card page 1120 on its touch screen display. In the first stage 1205, the user 5 performs a touch gesture on the touch-screen display to scroll the place card page 1120.

The second stage 1210 shows the mobile device 100 after scrolling to the bottom of the place card page 1120. In particular, the place card page includes several affordances 1220 and 1225 to customize the place card. In this example, the place card page includes an affordance 1220 to add a call log to the page. The place card of some embodiments includes a set of other affordances 1225 (e.g., selectable items, check boxes, etc.) to add or remove different sections (e.g., review section, social media section, photos section, etc.) from the place card page. The place card page may include affordances to rearrange different sections. In some embodiments, the edits to a place card are not global changes but only affect the place card for a particular location. Alternatively, the application of some embodiments provides tools to apply the changes to a group of place cards or all place cards. In some embodiments, the customization feature is only available to application developers. For instance, a third party developer can choose to add the call log or some other data type (e.g., using a set of AP's or a set of programming libraries of some embodiments), and not the user with a set of affordance.

In the second stage 1210, the user selects the affordance 1220 to add the call log to the place card page 1120. The third stage 1215 shows the user scrolling to the top of the place card page 1120 below the virtual stage in order to reveal a section 1230 with the call log. The call log includes a list of phone calls to or from the location, including missed and canceled calls.

IV. Adding Contacts from Maps

Figure 13:
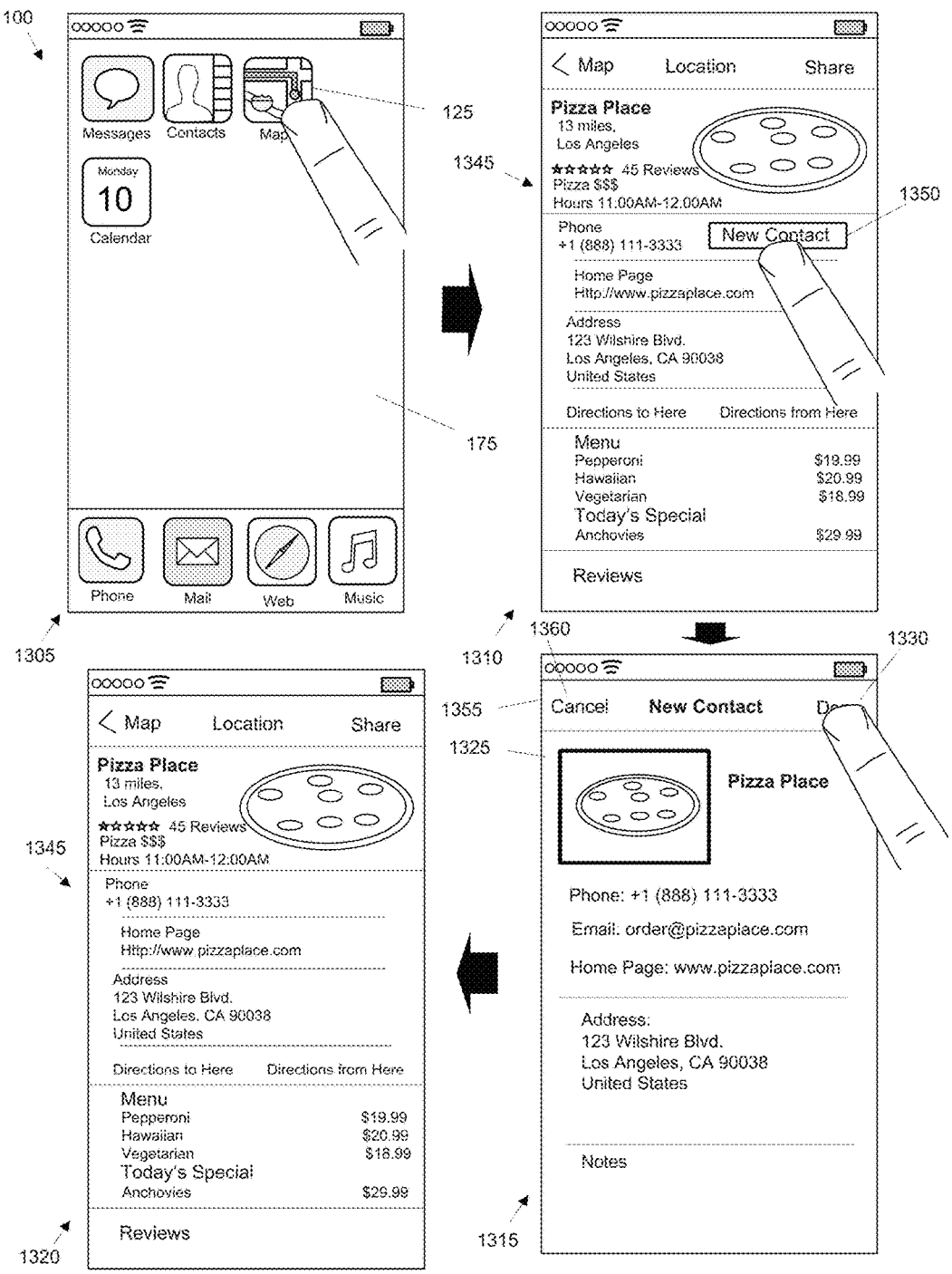
FIG. 13 shows an example of adding a new contact using a maps application.

The mobile device 100 of some embodiments includes a maps application that provides tools to search for a location and save the location as a new contact. FIG. 13 shows an example of creating a new contact using a maps application. Four operational stages 1305-1320 of the mobile device 100 are shown in the figure. The mobile device 100 is the same as the one descried above by reference to FIG. 1.

The first stage 1305 illustrates the user selecting the maps icon 125 from the home page 175 of the mobile device 100. The second stage 1310 shows the maps application displaying a place card 1345 for a location. The place card 1345 is similar to the one described above by reference to FIG. 1. However, in this example, the place card 1345 includes an affordance 1350 (e.g., a selectable item such as a button) to add the location as a contact.

As shown in the second stage 1310 the user selects the affordance to add the location as a new contact. The third stage 1315 shows that the maps application of some embodiments allows the user to review and edit the contact before saving it. In the example of the third stage 1315, the selection of the affordance resulted in a new contact form being populated with data from the shared local cache. The new contact form 1325 is also overlaid by a top bar 1355 that includes a done button 1330 to save the new contact and a cancel button 1360 to return to the previous view without saving the new contact.

Third stage 1315 shows the user selecting the done button 1330 to save the new contact. The fourth stage 1320 shows the maps application displaying the same place card 1345 after adding the location as a new contact. The fourth stage 1320 also shows that the maps application of some embodiments removes the affordance (e.g., the selectable item) from the place card 1345 once the location has been added as a new contact. In some embodiments, the place card shows at least two affordances, one to create a new contact and another to add data from the place card to an existing contact. These two affordance can be shown simultaneously.

In the example described above, the maps application is used to create a new contact. The maps application of some embodiments provides an option to add data to an existing contact. In some embodiments, a user's selection of the option causes an existing contact from a contact list to be filled with one or more pieces of data. For instance, several missing fields in the existing contact may be populated using place card data from the shared local cache.

Figure 14:
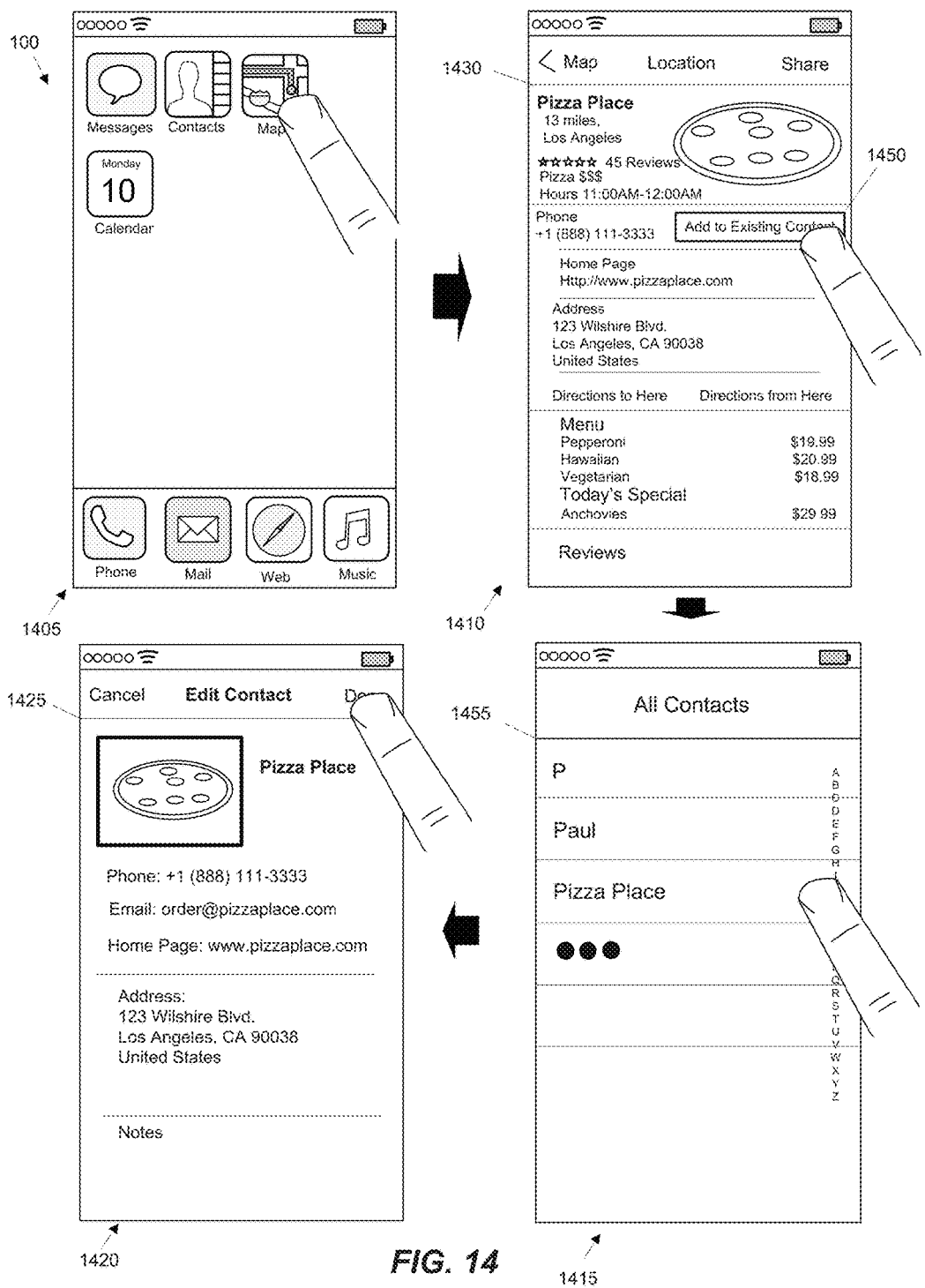
FIG. 14 shows an example of adding data to an existing contact.

FIG. 14 shows an example of adding data to an existing contact. Four operational stages 1405-1420 of the mobile device 100 are shown in this figure. This figure is similar to the previous figure. However, the second stage 1410 shows that the place card page 1430 of some embodiments includes an affordance 1450 to add data to an existing contact. Also, the third stage 1415 shows that a selection of the affordance causes the mobile device to display a contact list 1455. The user can use this list 1455 to choose a particular contact to add data to. The fourth stage 1420 show that the selection of the particular contact resulted in a display of a contact edit form 1425 instead of a new contact form. The contact edit form 1425 may be populated with one or more pieces of data from the shared local cache.

Figure 15:
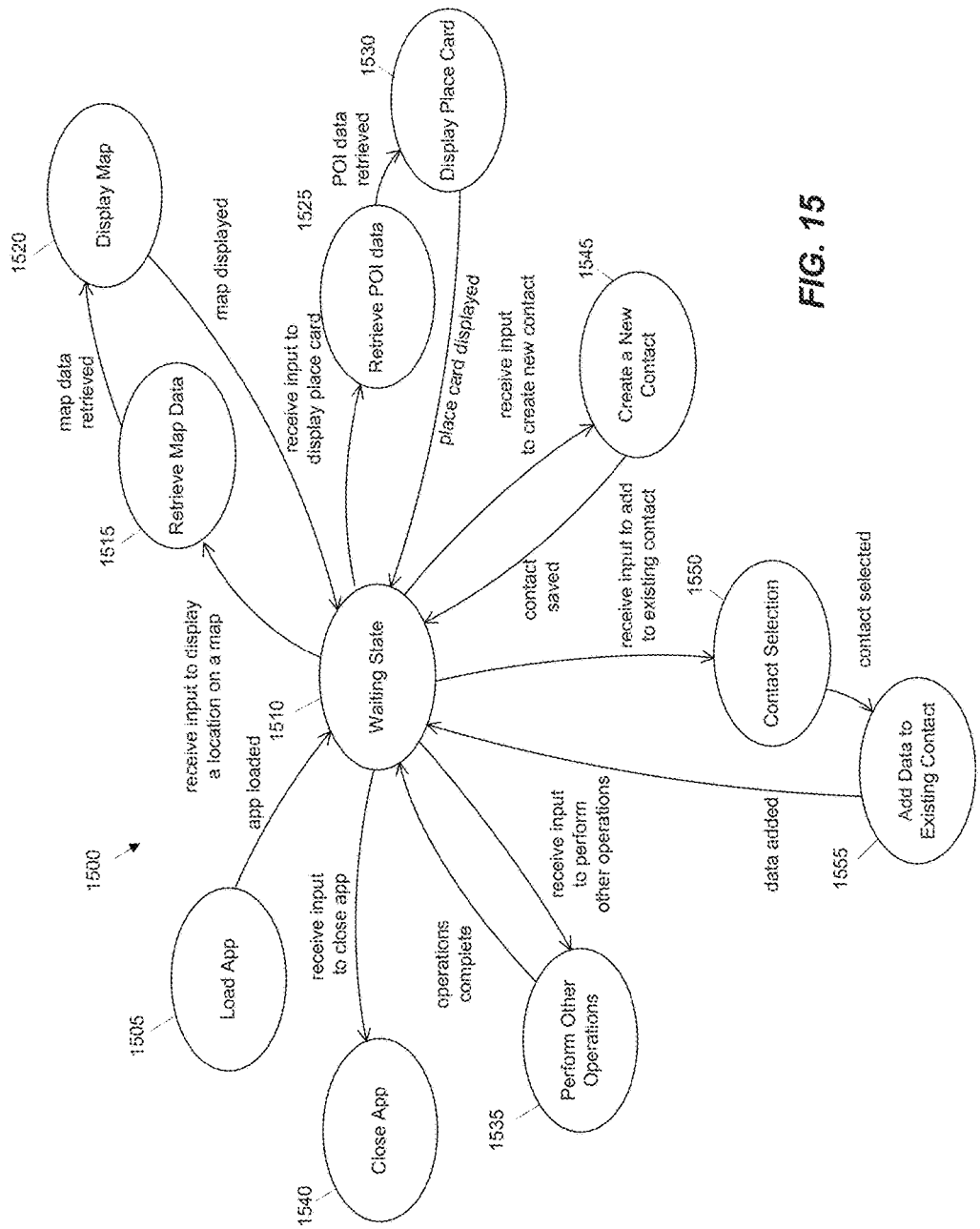
FIG. 15 presents a state diagram that illustrates several example processes performed by a maps application to save a location as a new contact or add data to an existing contact.

FIG. 15 presents a state diagram 1500 that illustrates several example processes performed by a maps application to save a location as a new contact or add data to an existing contact. This figure shows eleven states 1505-1555 that collectively perform these operations. Each of the states represents a set of one or more processes for performing a subset of the operations. The eleven states 1505-1555 are a load application state 1505, a waiting state 1510, a retrieved map data state 1515, a display map state 1520, a retrieve point of interest (POI) data state 1525, a display place card state 1530, a perform other operations state 1535, a close app state 1540, a create new contact state 1545, a contact selection state 1550, and an add to existing contact state 1555.

As show in FIG. 15, the maps application initially enters the load app state 1505. At 10 this state, the maps application might be performing a set of processes to load data. Once the data is loaded, the application of some embodiments transitions to a waiting state 1510. At this state 1510, the maps application is listening for different events. For instance, the maps application might be listening for user input to show a place card, close the maps application, search for a location, switch to a 3D map, enter a navigation mode, etc.

When an input is received to display a location on a map, the maps application of some embodiments transitions to the retrieve map data state 1515. At this state 1515, the maps application is performing a set of processes to retrieve map data in order to shows the location on the map. In some embodiments, the maps application first determines whether map data associated with the location is stored in a local cache. If so, the maps application retrieves the map data from the local cache. If the data is not available, the maps application retrieves the map data from a set of one or more servers and stores it in the local cache.

Upon retrieving the map data, the maps application of some embodiments transitions to the display map state 1520. At this state 1520, the maps application performs a set of processes to show the location on a map. An example of displaying a location on a map is described above 25 by reference to FIG. 1. Once the map is displayed, the maps application of some embodiments returns to the waiting state 1510.

When an input is received to display a place card for a location, the maps application of some embodiments transitions to the retrieve point of interest (POI) data state 1525. At this state 1525, the maps application is performing a set of processes to retrieve POI data in order to shows 30 a place card relating to the location. In some embodiments, the maps application first determines whether POI data associated with the location is stored in a local cache. In some embodiments, the maps application uses a unique identifier (ID) associated with the location to search the local cache. If the data is store in the local cache, the maps application retrieves the data from the cache. If the data is not available, the maps application retrieves the data from a set of one or more servers and stores it in the cache.

Upon retrieving the POI data, the maps application of some embodiments transitions to the display place card state 1530. At this state 1530, the maps application performs a set of processes to show a place card that includes data relating to the location. An example of displaying such a place card is described above by reference to FIG. 1. Once the place card is displayed, the maps application of some embodiments returns to the waiting state 1510.

When an input to save the location is received, the maps application of some embodiments transitions to the create a new contact state 1545. At this state 1545, the maps application performs a set of processes to save the location as a contact. Once the new contact is saved, the maps application of some embodiments returns to the waiting state 1510.

When an input to add data to an existing contact is received, the maps application of some embodiments transitions to the contact selection state 1550. At this state, the application of some embodiment performs a set of processes to receive selection of an existing contact. For instance, the application might display a contact list from which a person can choose an existing contact.

When an existing contact is selected, the application of some embodiments transitions to 20 the add data to existing contact state 1555. At this state 1555, the maps application performs a set of processes to fill one or more missing pieces of data of an existing contact. Once the data is filled in, the maps application of some embodiments returns to the waiting state 1510. In some embodiments, the maps application displays different affordances based on the contact in a contacts list (e.g., contacts database). For instance, the place card page may only show an affordance to create a new contact if the location is not already stored in the contacts list, or only show an affordance to add to an existing contact if the location is already stored in the contacts list. In some embodiments, the place card page may simultaneously display two selectable items representing creating a new contact and adding data to an existing contact.

In some embodiments, the maps application saves one or more pieces of data in a contacts list (e.g., a contacts database) based on the data stored in the local cache. For instance, the maps application might save the unique ID (e.g., POI ID) associated with the location. The maps application might also save other data in the contacts storage, such as a name, one or more phone numbers, address information, etc.

The maps application of some embodiments performs other operations. For instance, the maps application may be used to present turn-by-turn navigation, show traffic, show a 3D map 5 presentation, etc. Accordingly, the state diagram includes the perform other operations state 1535. At this state 1535, the maps application performs a set of processes to perform such different tasks. Finally, when an input to close the maps application is received, the maps application transitions to the close maps application state 1440. At this stage 1540, the maps application performs a set of processes to close the maps application.

One of ordinary skill in the art will realize that the state diagram 1500 simplifies the operations of the maps application in order to place emphasis on the contact saving feature. In addition, one of ordinary skill in the art will also realize that the map application in other embodiments has different states or different state transitions as it operates differently. Also, in the example described above, the maps application is used to save a new contact. However, the application can be any application that allows a person to search for a location.

V. Example Phone Application

As mentioned above, the phone application of some embodiments can be used to display a place card relating to a location. Also, as mentioned above, in some embodiments, the phone application displays a place card for a location regardless of whether the location is stored as a contact in a contacts list (e.g., contacts database). In conjunction with the place card feature or instead of it, the phone application of some embodiments displays the name associated with the location during a phone call regardless of whether the location is stored regardless of whether the location is stored as a contact in a contacts list. Several such example operations will now be described below by reference to FIGS. 16-18.

Figure 16:
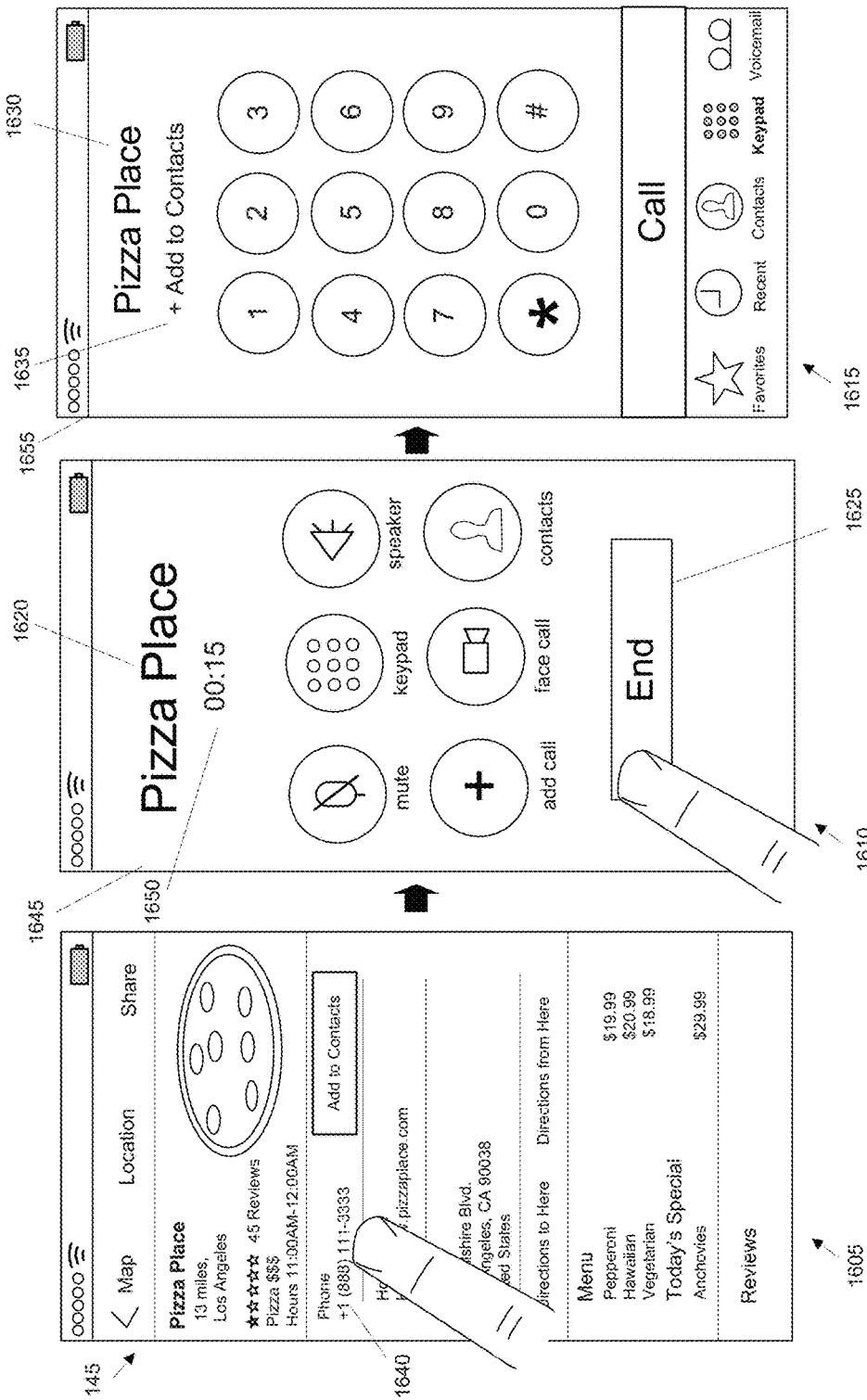
FIG. 16 provides an illustrative example of a phone application that displays the name associated with a location even though that location is not in a contacts list.

FIG. 16 provides an illustrative example of a phone application that displays the name associated with a location even though that location is not in a contacts list. Three operational stages 1605-1615 the mobile device 100 are shown in this figure. The first stage 1605 shows a map application displaying a place card page 145 relating to a restaurant on the touch-sensitive screen of the mobile device. The place card page 145 shows a phone number 1640. To call the phone number, a user of the mobile device performs a touch-based gesture by tapping the user's finger on the touch-sensitive screen over the phone number. In this example, the phone number is not stored in the contacts list as part of an existing contact.

The second stage 1610 shows the mobile device 100 after the user has selected the phone number 1640. The selection resulted in the phone application being opened. The second stage shows the phone application during the phone call. The phone application is displaying a call page 1645. The call page 1645 includes various selectable items (e.g., buttons). For instance, the call page includes a mute button, a keypad button to show a keypad, a speaker button to output the phone call to a speaker, an add call button to add a call, a video call to start a video call, and a contact button to browse contacts. The call page also includes an end button 1625 to end the phone call. Furthermore, the call page includes a top section that displays information relating to the phone call. The top section shows the name of the restaurant 1620 instead f the restaurant's phone number. Underneath the name is also a timer 1650 that shows the duration of the phone call.

In the second stage 1610, the user selects the end button 1625 to end the phone call. The third stage 1615 shows that the phone application of some embodiments displays a page 1655 with the keypad upon ending the phone call. The top section of this keypad page 1655 also shows the last phone call. Instead of showing the restaurant's phone number, the top section shows the restaurant's name 1630 even though the phone number is not stored in the contacts list as part of an existing contact. The top section also includes a selectable item 1635 to add the location as a new contact to the contacts list.

Figure 17:
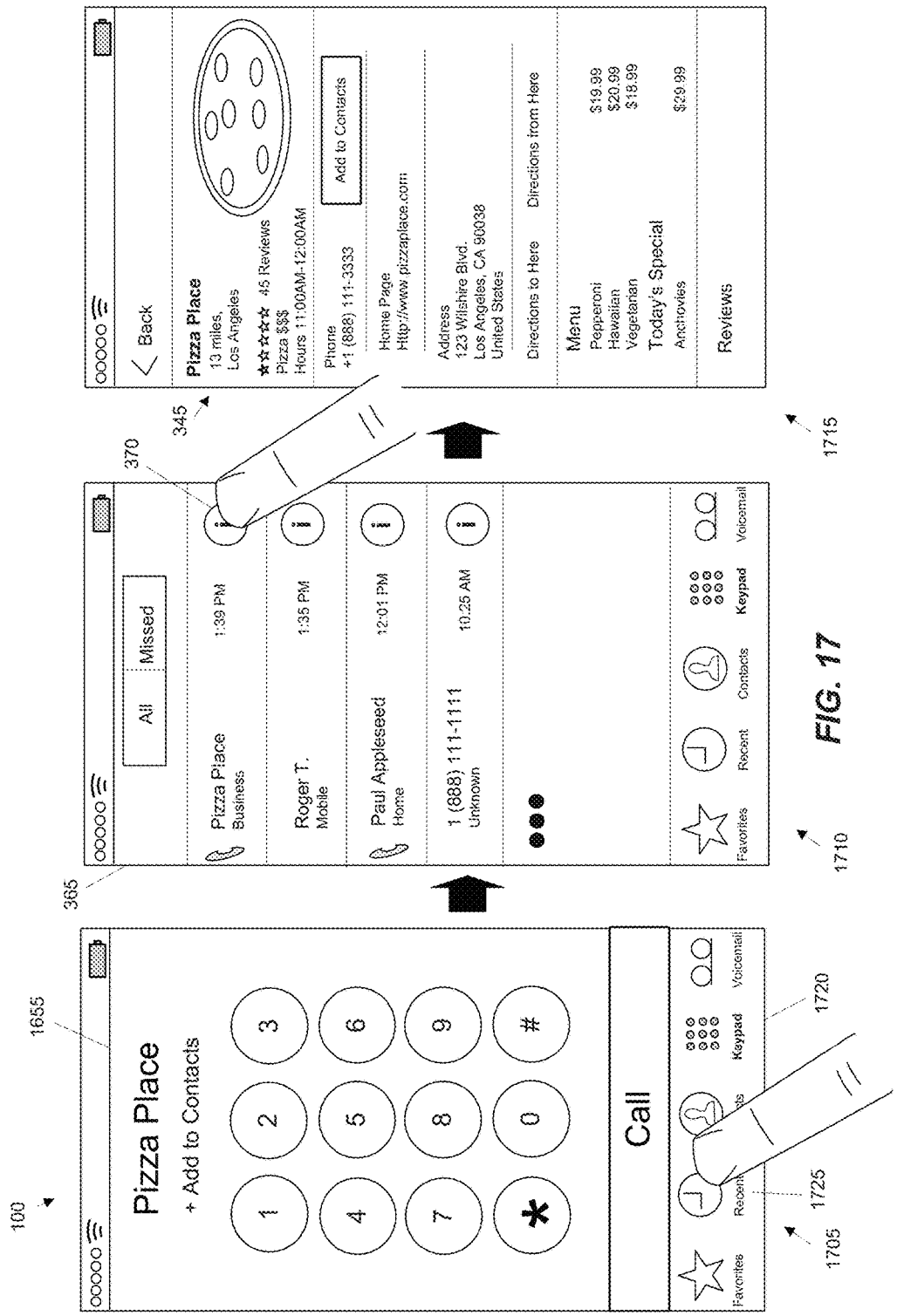
FIG. 17 provides an illustrative example of a phone application that displays the name of location in a recent call list even though the location is not in a contacts list.

In the example described above, the phone application displays the name associated with a location even though the location has not been saved as a contact in a contacts list. One of ordinary skill in the art would understand that the phone application shown in FIG. 17 is an example application and that different embodiments might present the location differently. As an example, the phone application may display the phone number of the location along with the 25 name of the location. The phone application can present one or more other pieces data relating to the location (e.g., by retrieving the data from a local cache).

FIG. 17 provides an illustrative example of a phone application that displays the name of location in a recent call list even though the location is not in a contacts list. This figure also shows an example of how the phone application displays a place card relating to the location even though the location is not in the contacts list.

Three operational stages 1705-1715 of the mobile device 100 are shown in this figure. The first stage 1705 shows the phone application displaying the keypad page 1655. The keypad page 1655 is overlaid by a bottom bar 1720 that includes a selectable item (e.g., a recent button) to display a list of recent calls. In the first stage 1705, the user directs the mobile device 100 to display the list of recent calls by tapping a finger over the device's touch-screen display over the selectable item 1725.

As shown in the second stage 1710, the touch-based gesture caused the mobile device 100 to display a recent call page 365 with a list of recent calls. The recent call page shows that the location is listed on the call page 365 with its name instead of with its phone number. The location is also shown with a selectable item 370 (e.g., an information button) to display additional information. In the second stage 1710, the user selects the selectable item by tapping a finger on the device's touch-screen display over the selectable item 370. The third stage 1715 illustrates that the selection of the selectable item 370 resulted in the display of a place card page 345. The place card page 345 is displayed even though the location is not stored in a contacts list as a contact. In some embodiments, the phone application presents such a place card only when data relating to the location is stored in a local cache. In other words, the phone application might not access an external data source to retrieve the data in order to show the place card.

The example of the third stage 1715 also shows that the place card 345 can include an affordance to add the business entity as a new contact. In some embodiments, the place card might provide an option to add the data to an existing contact. Examples of adding a new contact and editing an existing contact are described above by reference to FIGS. 13-15.

In some embodiments, the phone application shows information relating to the phone call if the place card data is not stored in the shared local cache. For instance, upon selection of the affordance 370, the phone application might display at least one of the phone number, the time of the phone call, duration of the phone call, an indication of whether the call was canceled, an indication whether the phone call is a missed call, an option to add the phone number as a new contact, and add the number to an existing contact.

Figure 18:
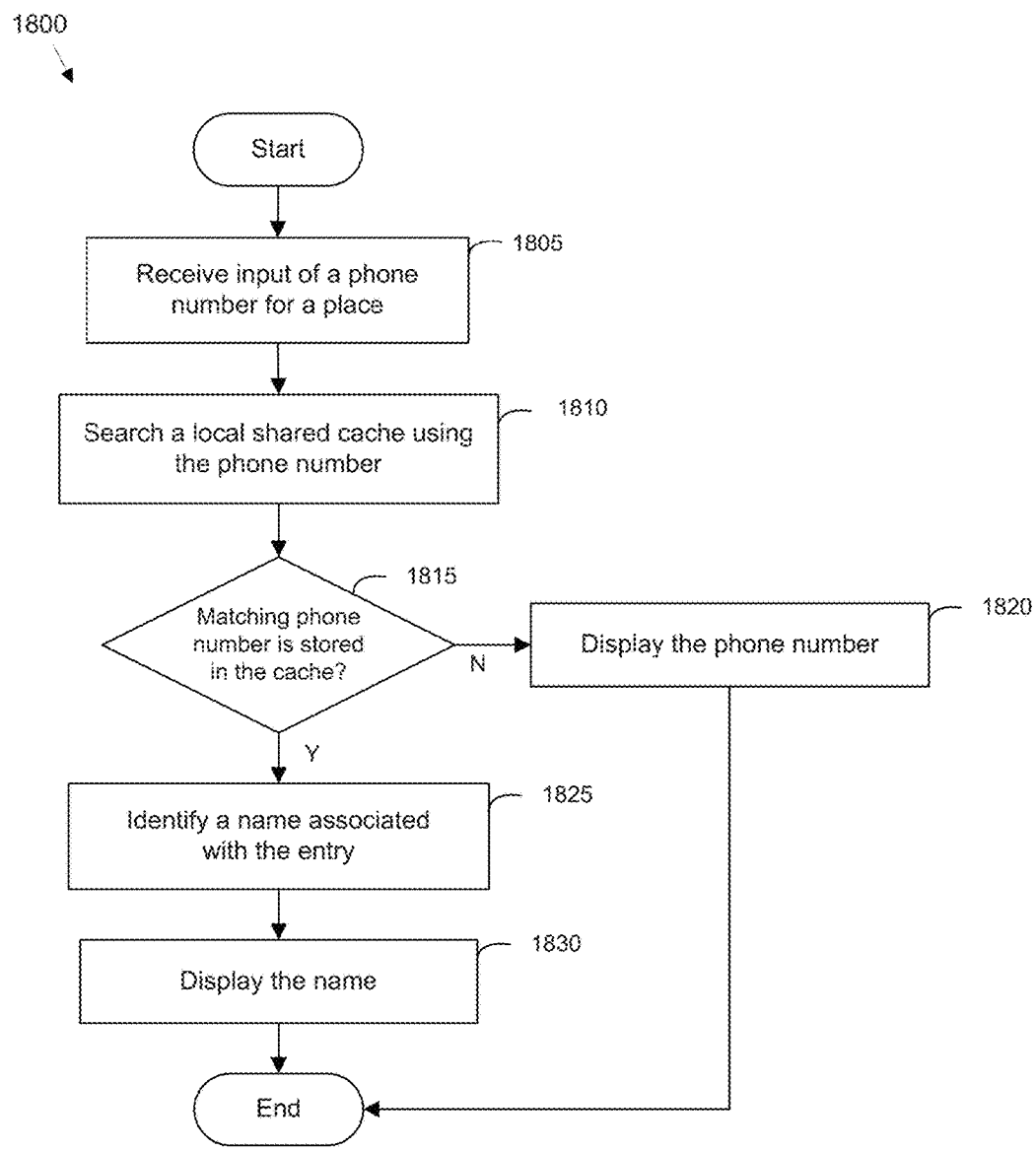
FIG. 18 conceptually illustrates an example process that some embodiments implement to display data relating to a phone call.

FIG. 18 conceptually illustrates an example process 1800 that some embodiments implement to display data relating to a phone call. In some embodiments, the process 1800 is performed by a phone application. As shown, the process 1800 begins when it receives (at 1805) of a phone number of a place. The process 1800 then searches (at 1810) a local cache using the phone number.

At 1815, the process 1800 determines whether a matching phone number is stored in the cache. If the matching phone number is stored in the cache, the process 1800 identifies (at 1825) a name associated with the entry. The process 1800 then displays (at 1830) the name of place. The process 1800 then ends. If the matching phone number is not stored in the cache, the process 1800 displays (at 1820) the phone number. The process 1800 then ends.

Some embodiments perform variations on the process 1800. The specific operations of the process 1800 may not be performed in the exact order shown and described. The specific operations may not be performed in one continuous series of operations, and different specific operations may be performed in different embodiments. Further, the process 1800 could be implemented using several sub-processes, or as part of a larger macro process.

VI. System Architecture

Figure 19:
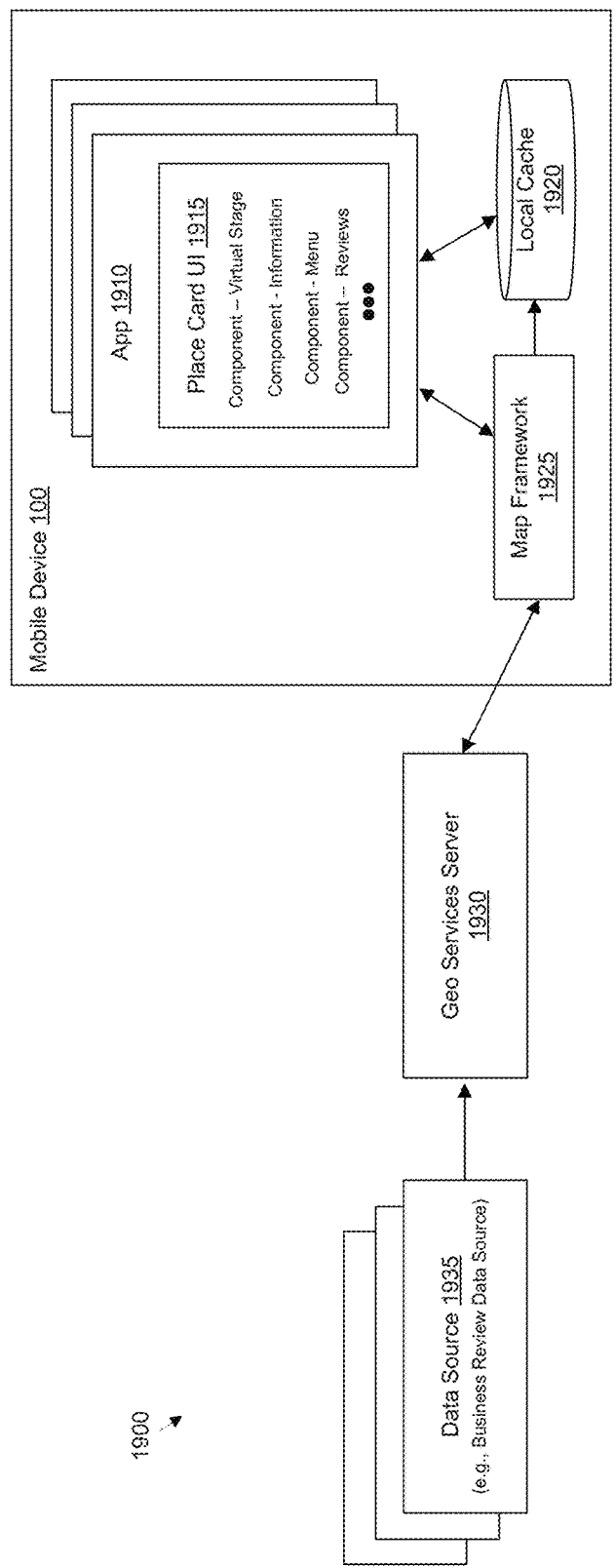
FIG. 19 provides an illustrative example of system for retrieving data from a set of servers and displaying place cards using the retrieved data.

In several of the examples described above, an application retrieves data from a shared local cache to display a place card relating to a location. The application retrieves data from a set of one or more servers if the data is not stored in the shared local cache. FIG. 19 provides an illustrative example of system 1900 for retrieving data from a set of servers and displaying place cards using the retrieved data. As shown, the system includes the mobile device 100, a geo services server 1930, and a set of one or more data servers 1935.

The example system shows the mobile device 100 is a smart phone. However, one of ordinary skill in the art will realize that the discussion in this example is equally applicable to any different types of machines or electronic devices (e.g., a digital media player appliance, a gaming system, etc.). The mobile device 100 includes several applications 1910. Each application uses a common place card user interface (UI) 1915 to display data relating to different places. The application accesses a shard local cache 1920 to retrieve data relating to the location. If the data is not available, the application uses a framework 1925 or an application programming interface (API) to access an external source and retrieve the data from the external source.

In the example of the FIG. 19, the framework 1925 is a map framework and the external source is a geo services server 1930. The map framework 1925 of some embodiments provides an interface for embedding maps directly into application windows and views. The 30 framework 1925 of some embodiments also provides support for annotating the map, adding overlays, and performing reverse-geocoding lookups to determine placemark information for a given map coordinate. In some embodiments, the framework 1925 defines a set of method calls to retrieve data from the geo services server 1930.

The framework 1925 of some embodiments is used to communicate with the geo services server 1930 using a particular protocol. The protocol of some embodiments is flexible in that it can be used to inform the server 1930 the types of data that the application 1910 can display. As an example, in some embodiments, each section of data (e.g., virtual stage, the review sections) is defined as a component of a place card. The application 1910 informs the server 1930 that it supports a place card that can display one or more of components. The server then provides component data to the application. The ability to inform the server is particular useful for compatibility reasons. For instance, the place card may evolve to support various different data types that are not supported by earlier versions. The server 1930 does not have to figure out what placecard version the application is using. Instead, the application informs the server that it supports a set of components. The data transfer protocol of some embodiments is further described in U.S. patent application No. 14/292,766, entitled "Protocol for Exchanging Data between Two Devices", concurrently filed with this application. This concurrently filed U.S. patent application No. 14/292,766 is incorporated herein by reference.

In some embodiments, the server 1930 only sends a few data objects for one or more of the components. For instance, the server might only send some number of user reviews for a review section, some number of multimedia (e.g., photos, video) for a multimedia section, etc. When the application request additional data, the server might send a few more data objects or the remaining data objects. In some embodiments, each component is associated with a number that identifies all available data objects associated with the component. This number may be shown in the place card itself (e.g., in the heading).

In some embodiments, the server 1930 can control how each component is presented on the place card UI. For instance, when the application informs the server that these are the components that it can display, the server might send the components and specify the ordering in which the components are displayed. In some embodiments, the type of data that the place card can display can be expanded by simply defining a new component. In this manner, the place card feature can evolve to include many different components for different data types that are tailored for different types of locations or point of interests (POIs).

In some embodiments, the geo services server retrieves data from one or more data sources 1935. For instance, the geo services server 1930 may request data from each data source 1935 on behalf of the application, and send the retrieved data from the data source to the application. The server 1930 may also perform some level of filtering to only send several data objects of each component to the application.

The data source can be any data source that provides data to the geo services server. For instance, the data source can be a server that is associated with a business review service, a social network service, an event ticket processing service, upcoming concerts, sporting events, a movie showtime service, a transit information service, a parking service that provides data relating to parking spaces that are available at a parking lot, a travel service, etc.

The local cache 1920 of some embodiments stores different groups of data objects for different locations. There are numerous different ways to implement such a cache. For instance, a database can be used, a container object can be used, etc. Each group of data objects may be retrieved using a unique identifier (ID). As mentioned above, the application of some embodiments uses a POI ID. Alternatively, the application of some embodiments uses a phone number as the unique ID. There are numerous different ways to implement such a cache.

One of ordinary skill in the art would understand that the software architecture described above is one example architecture and can be modified in a number of different ways. For example, instead of one framework to gather data, the system may include a number of frameworks or APis to gather data from various different data sources. The mobile device 100 may communicate directly with one or more of the data servers instead of communing with them indirectly through the geo services server 1930. For instance, the mobile device operating system of some embodiments includes several APis that can be used to gather data from different servers associated with different social network services. The system may also retrieve data (e.g., photos, videos, call log) locally from one or more storages. For instance, the mobile device may retrieve a call log from a local phone data storage (e.g., database) or phone application cache in order to display the call log on a place card.

Also, to simplify the description, the system 1900 only shows one geo services server 1930. However, there can be a cluster of such geo services servers.

VII. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 20:
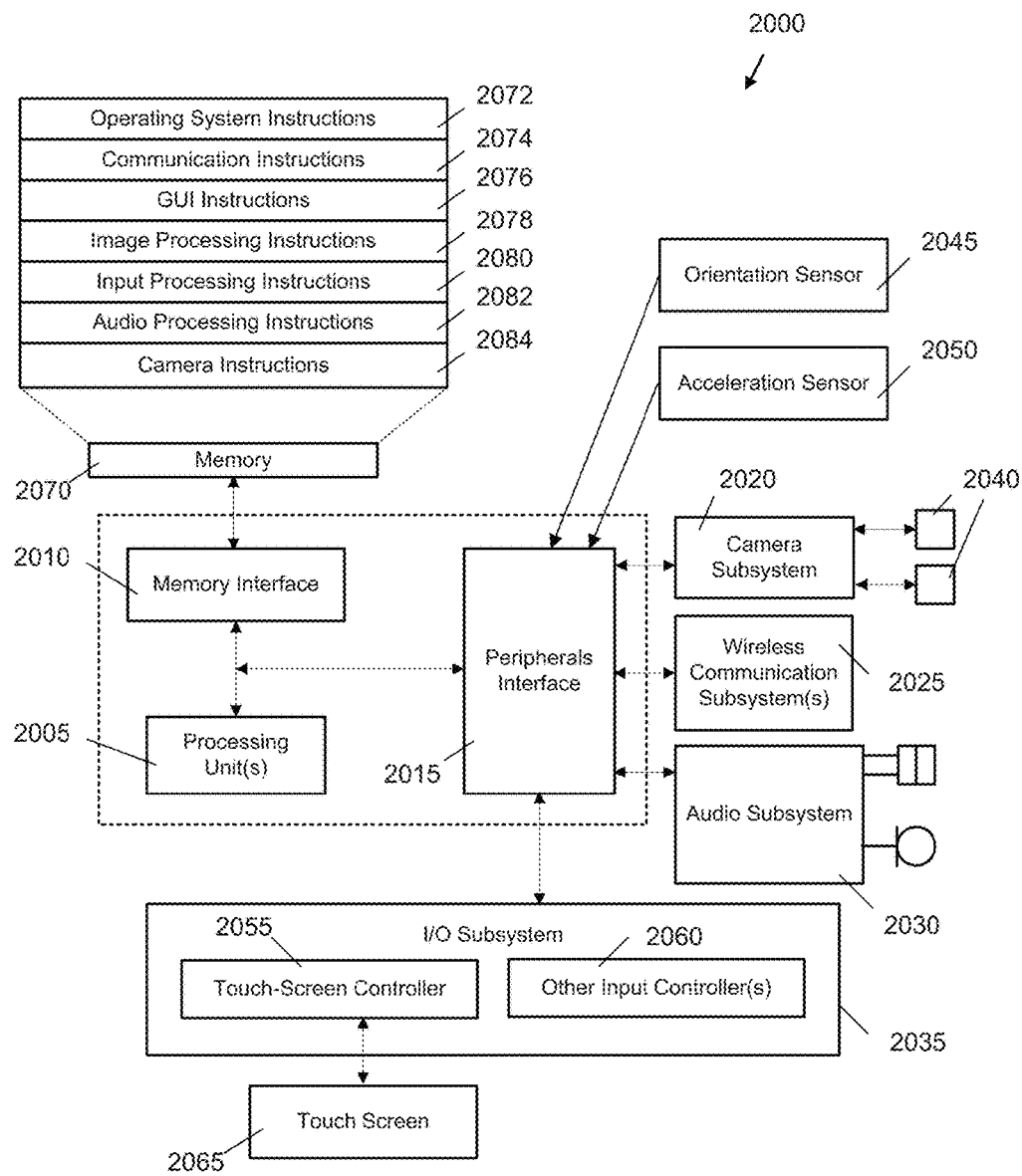
FIG. 20 is an example of an architecture of a mobile computing device.

The applications of some embodiments operate on mobile devices. These applications include the content viewing application, content authoring application, content delivery application. FIG. 20 is an example of an architecture 2000 of such a mobile computing device. Examples of mobile computing devices include smartphones, tablets, laptops, etc. As shown, the mobile computing device 2000 includes one or more processing units 2005, a memory interface 2010 and a peripherals interface 2015.

The peripherals interface 2015 is coupled to various sensors and subsystems, including a camera subsystem 2020, a wireless communication subsystem(s) 2025, an audio subsystem 2030, an I/O subsystem 2035, etc. The peripherals interface 2015 enables communication between the processing units 2005 and various peripherals. For example, an orientation sensor 2045 (e.g., a gyroscope) and an acceleration sensor 2050 (e.g., an accelerometer) is coupled to the peripherals interface 2015 to facilitate orientation and acceleration functions.

The camera subsystem 2020 is coupled to one or more optical sensors 2040 (e.g., a charged coupled device (CCD) optical sensor, a complementary metal-oxide-semiconductor (CMOS) optical sensor, etc.). The camera subsystem 2020 coupled with the optical sensors 2040 facilitates camera functions, such as image and/or video data capturing. The wireless communication subsystem 2025 serves to facilitate communication functions. In some embodiments, the wireless communication subsystem 2025 includes radio frequency receivers and transmitters, and optical receivers and transmitters (not shown in FIG. 20). These receivers and transmitters of some embodiments are implemented to operate over one or more communication networks such as a GSM network, a Wi-Fi network, a Bluetooth network, etc. The audio subsystem 2030 is coupled to a speaker to output audio (e.g., to output different sound effects associated with different image operations). Additionally, the audio subsystem 2030 is coupled to a microphone to facilitate voice-enabled functions, such as voice recognition, digital recording, etc.

The I/O subsystem 2035 involves the transfer between input/output peripheral devices, such as a display, a touch screen, etc., and the data bus of the processing units 2005 through the peripherals interface 2015. The I/O subsystem 2035 includes a touch-screen controller 2055 and other input controllers 2060 to facilitate the transfer between input/output peripheral devices and the data bus of the processing units 2005. As shown, the touch-screen controller 2055 is coupled to a touch screen 2065. The touch-screen controller 2055 detects contact and movement on the touch screen 2065 using any of multiple touch sensitivity technologies. The other input controllers 2060 are coupled to other input/control devices, such as one or more buttons. Some embodiments include a near-touch sensitive screen and a corresponding controller that can detect near-touch interactions instead of or in addition to touch interactions.

The memory interface 2010 is coupled to memory 2070. In some embodiments, the memory 2070 includes volatile memory (e.g., high-speed random access memory), non-volatile memory (e.g., flash memory), a combination of volatile and non-volatile memory, and/or any other type of memory. As illustrated in FIG. 20, the memory 2070 stores an operating system 30 (OS) 2072. The OS 2072 includes instructions for handling basic system services and for performing hardware dependent tasks.

The memory 2070 also includes communication instructions 2074 to facilitate communicating with one or more additional devices; graphical user interface instructions 2076 to facilitate graphic user interface processing; image processing instructions 2078 to facilitate image-related processing and functions; input processing instructions 2080 to facilitate input-related (e.g., touch input) processes and functions; audio processing instructions 2082 to facilitate audio-related processes and functions; and camera instructions 2084 to facilitate camera-related processes and functions. The instructions described above are merely exemplary and the memory 2070 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 20 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 20 may be split into two or more integrated circuits.

B. Computer System

Figure 21:
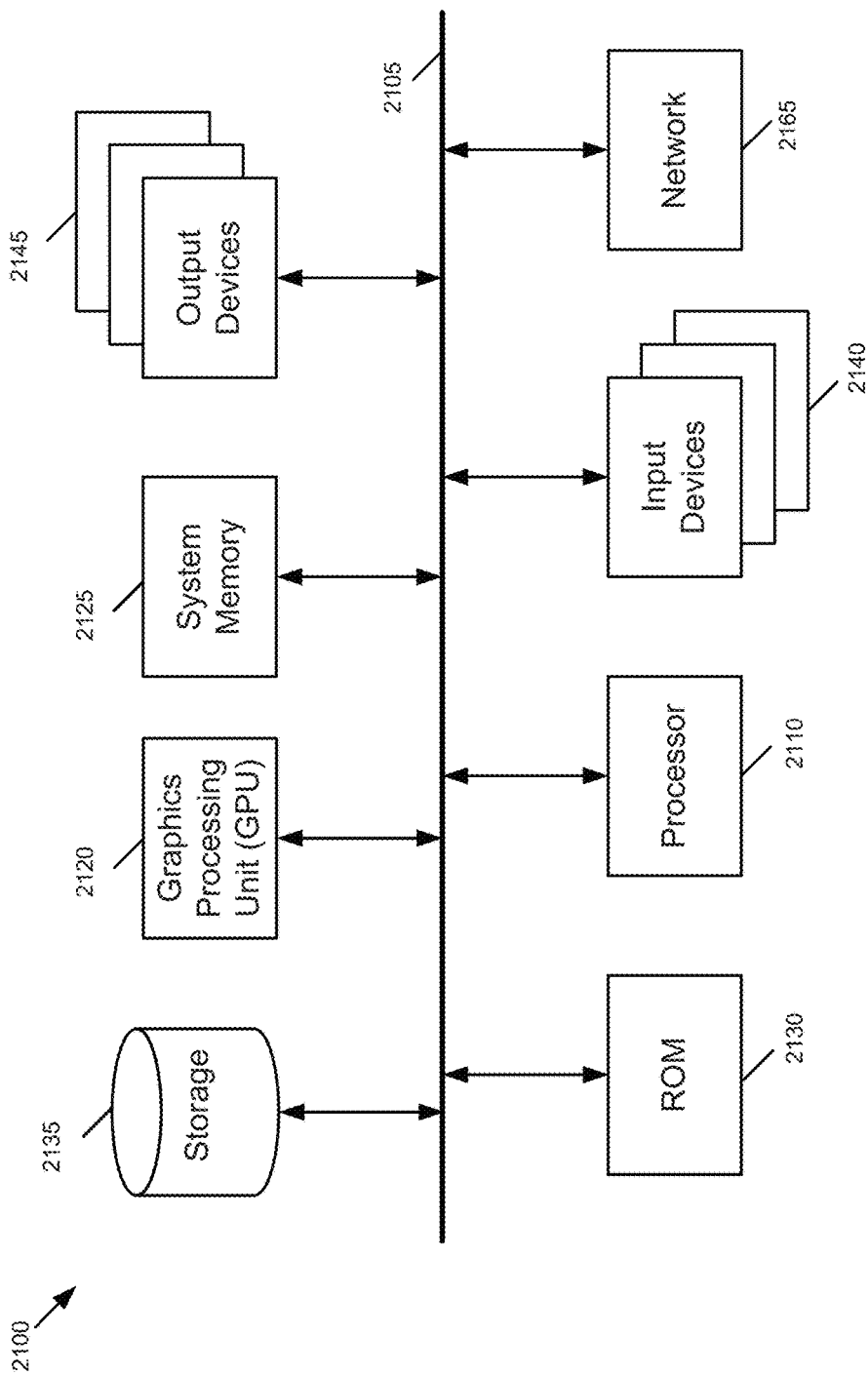
FIG. 21 conceptually illustrates another example of an electronic system with which some embodiments of the invention are implemented.

FIG. 21 conceptually illustrates another example of an electronic system 2100 with which some embodiments of the invention are implemented. The electronic system 2100 may be a computer (e.g., a desktop computer, personal computer, tablet computer, etc.), phone, PDA, or 25 any other sort of electronic or computing device. Such an electronic system includes various types of computer readable media and interfaces for various other types of computer readable media. Electronic system 2100 includes a bus 2105, processing unit(s) 2110, a graphics processing unit (GPU) 2115, a system memory 2120, a network 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the GPU 2115, the system memory 2120, and the permanent storage device 2135.

From these various memory units, the processing unit(s) 2110 retrieves instructions to execute and data to process in order to execute the processes of the invention. The processing unit(s) may be a single processor or a multi-core processor in different embodiments. Some instructions are passed to and executed by the GPU 2115. The GPU 2115 can offload various computations or complement the image processing provided by the processing unit(s) 2110.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash memory device, etc., and its corresponding drive) as the permanent storage device. Like the permanent storage device 2135, the system memory 2120 is a read-and-write memory device. However, unlike storage device 2135, the system memory 2120 is a volatile read-and-write memory, such a random access memory. The system memory 2120 stores some of the instructions and data that the processor needs at runtime. In some embodiments, the invention's processes are stored in the system memory 2120, the permanent storage device 2135, and/or the read only memory 2130. For example, the various memory units include instructions for processing multimedia clips in accordance with some embodiments. From these various memory units, the processing unit(s) 2110 retrieves instructions to execute and data to process in order to execute the processes of some embodiments.

The bus 2105 also connects to the input and output devices 2140 and 2145. The input devices 2140 enable the user to communicate information and select commands to the electronic system. The input devices 2140 include alpha-numeric keyboards and pointing devices (also called "cursor control devices"), cameras (e.g., web cams), microphones or similar devices for receiving voice commands, etc. The output devices 2145 display images generated by the electronic system or otherwise output data. The output devices 2145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 21, bus 2105 also couples electronic system 2100 to a network 2125 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVDROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include 20 machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 5, 8, 9, 15, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, one of ordinary skill in the art will understand that many of the UI items of FIGS. 1-4, 6, 7, 10A, 10B, 13, 16, and 17 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A method for processing user input, comprising:
   receiving a point of interest from a search field,
   wherein the search field is part of a graphical user interface (GUI) of a messaging application that provides text-based messaging between two-electronic devices;
   collecting different types of data relating to the point of interest into a place card;
   presenting the different types of data on the place card, via the GUI of the messaging application, in an order,
   wherein the different types of data comprise a tangible good or food associated with the point of interest, and an affordance to purchase the tangible good or food; and
   sharing the place card by providing a text-based message to a recipient device via the text-based messaging.

2. The method of claim 1, wherein the place card is displayed on a mobile device.

3. The method of claim 1, wherein the different types of data comprise at least one of: name, address, phone number, URL, price range, hours of operation, videos, photos, reviews, menu, movie showtimes, schedule of events, social network data, estimated arrival time, reviews.

4. The method of claim 1, further comprising: upon selecting the affordance, displaying another page through which the purchase is completed.

5. The method of claim 1, wherein the different types of data further include social network data, including a set of posts regarding the location and multimedia associated with the point of interest.

6. The method of claim 1, wherein the different types of data further includes a map showing the location of the point of interest.

7. The method of claim 1, wherein the order is specified by an external server that controls how the different types of data are presented on the place card.

8. A tangible, non-transitory, machine-readable medium, comprising machine-readable instructions that, when executed by the one or more processors, cause the one or more processors to:
   execute a messaging application that provides text-based messaging between two electronic devices;
   receive a request, via a graphical user interface (GUI) of the messaging application, for an affordance to view data relating to a point of interest; and in response to the request, cause presentation of a place card that comprises data related to the point of interest.

9. The tangible, non-transitory, machine-readable medium of claim 8, comprising instructions that, when executed by the one or more processors, cause the one or more processors to collect different types of data relating to the point of interest into the place card.

10. The tangible, non-transitory, machine-readable medium of claim 8, wherein the data comprises a tangible good or food associated with the point of interest, and an affordance to purchase the tangible good or food.

11. The tangible, non-transitory, machine-readable medium of claim 8, comprising machine-readable instructions that, when executed by the one or more processors, cause the one or more processors to:

cause presentation of the place card via the GUI of the messaging application.

12. The tangible, non-transitory, machine-readable medium of claim 8, comprising machine-readable instructions that, when executed by the one or more processors, cause the one or more processors to:

cause presentation of the place card at a recipient device via the text-based messaging by sharing the place card via a text-based message.

13. A tangible, non-transitory, machine-readable medium, comprising machine-readable instructions that, when executed by one or more processors, cause the one or more processors to:

execute a messaging application that provides text-based messaging between two electronic devices;

receive a text-based message from a sending electronic device, the text-based message comprising an indication of an affordance to view data relating to a point of interest that was made via the sending electronic device;

in response to receiving the text-based message, render, via a graphical user interface (GUI) of the messaging application, an indication of the affordance.

14. The tangible, non-transitory, machine-readable medium of claim 13, wherein the indication of the affordance comprises a place card related to the point of interest.

15. The tangible, non-transitory, machine-readable medium of claim 13, wherein the place card comprises a tangible good or food associated with the point of interest.

16. The tangible, non-transitory, machine-readable medium of claim 13, wherein the indication of the affordance comprises a thumbnail image configured to represent the point of interest.

17. The tangible, non-transitory, machine-readable medium of claim 13, comprising machine-readable instructions that, when executed by the one or more processors, cause the one or more processors to:

detect a selection of the indication; and in response to the selection, render, via the GUI, a place card related to the point of interest.

18. An electronic device, comprising:

a display;

one or more processors, configured to:

execute a messaging application that provides text-based messaging between the electronic device and another electronic device;

receive a request, via a graphical user interface (GUI) of the messaging application, for an affordance to view data relating to a point of interest; and in response to the request, cause presentation of a place card that comprises data related to the point of interest, via the display.

19. The electronic device of claim 18, wherein the data comprises:

a tangible good or food associated with the point of interest; and an affordance to purchase the tangible good or food.

20. The electronic device of claim 18, wherein the data comprise at least one of: name, address, phone number, URL, price range, hours of operation, videos, photos, reviews, menu, movie showtimes, schedule of events, social network data, estimated arrival time, reviews.

21. The electronic device of claim 18, wherein the one or more processors are configured to cause presentation of the place card via the GUI of the messaging application.

22. The electronic device of claim 18, wherein the one or more processors are configured to cause presentation of the place card at a recipient device via the text-based messaging by sharing the place card via a text-based message.

* * * * *